United States Patent
Bendiksen et al.

(10) Patent No.: US 7,996,853 B2
(45) Date of Patent: *Aug. 9, 2011

(54) METHOD AND APPARATUS FOR CORRELATION OF EVENTS IN A DISTRIBUTED MULTI-SYSTEM COMPUTING ENVIRONMENT

(75) Inventors: Aage Bendiksen, Wheaton, IL (US); Benny Tseng, Brookfield, CT (US); Louis Zhongliang Lu, Southbury, CT (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1156 days.

This patent is subject to a terminal disclaimer.

(21) Appl. No.: 11/243,240

(22) Filed: Oct. 4, 2005

(65) Prior Publication Data

US 2006/0085798 A1    Apr. 20, 2006

Related U.S. Application Data

(63) Continuation of application No. 09/564,929, filed on May 5, 2000, now Pat. No. 7,003,781.

(51) Int. Cl.
*G06F 9/44* (2006.01)
*G06F 17/00* (2006.01)

(52) U.S. Cl. ...................................................... 719/328
(58) Field of Classification Search .................. None
See application file for complete search history.

(56) References Cited

U.S. PATENT DOCUMENTS

| | | | | |
|---|---|---|---|---|
| 5,583,761 A | 12/1996 | Chou | ............................. | 395/798 |
| 5,737,393 A | 4/1998 | Wolf | ............................ | 379/88.13 |
| 5,768,577 A | 6/1998 | Kleewein et al. | ............... | 707/10 |
| 5,857,190 A | 1/1999 | Brown | ............................. | 707/10 |
| 5,889,518 A | 3/1999 | Poreh et al. | .................... | 345/804 |
| 5,894,573 A * | 4/1999 | Fukasawa et al. | ............. | 719/310 |
| 5,941,996 A | 8/1999 | Smith et al. | ...................... | 714/47 |
| 5,956,507 A | 9/1999 | Shearer, Jr. et al. | ........... | 395/674 |
| 6,108,700 A * | 8/2000 | Maccabee et al. | ............. | 709/224 |
| 6,181,364 B1 | 1/2001 | Ford | ............................... | 348/5.5 |
| 6,381,606 B1 | 4/2002 | Carpenter et al. | ............. | 707/100 |
| 6,484,150 B1 | 11/2002 | Blinn | .............................. | 705/26 |
| 6,542,922 B1 * | 4/2003 | Chessell et al. | ............... | 709/203 |
| 6,625,117 B1 | 9/2003 | Chen et al. | ..................... | 370/227 |
| 6,813,636 B1 * | 11/2004 | Bean et al. | ..................... | 709/226 |
| 6,817,018 B1 * | 11/2004 | Clarke et al. | ................... | 719/313 |
| 7,003,781 B1 * | 2/2006 | Blackwell et al. | ............. | 719/327 |
| 7,143,186 B2 * | 11/2006 | Stewart et al. | ................ | 709/245 |

OTHER PUBLICATIONS

Fabio Silva, "network Routing application programmer's interface and Walk through", Dec. 9, 2002.*
"An Introduction to Messaging and Queuing", IBM MQSeries, Jun. 1995, pp. III-VIII, 1-35.
Chalmers, Message System, Sep. 8, 1997, p. 1.
IBM Technical Disclosure Bulletin-Method of Tracing Events in Multi-threaded OS/2 Applications, vol. 36, No. 9A, Sep. 1993—entire article.
IBM, An Introduction to Mesaging and Queuing, 1993, 1995.
System Engineering, MQSeries Integrator, Jun. 7, 1999.
Verheil, MQSeries Standards and Guidelines, Oct. 1, 1999.
IBM Technical Disclosure Bulletin, vol. 40, No. 7, Jul. 1997, pp. 117-128.

* cited by examiner

*Primary Examiner* — Lechi Truong
*Assistant Examiner* — Abdou K Seye

(57) ABSTRACT

There is provided a method that includes (i) examining first data from a first Application Program Interface (API) call and second data from a second API call to determine whether (a) the first API call sent a message, and the second API call received the message, or (b) the first API call was conducted in a transactional unit of work, and the second API was also conducted in the transactional unit of work, and (ii) employing the first data and the second data in a subsequent process, if either of (a) or (b) is true.

4 Claims, 18 Drawing Sheets

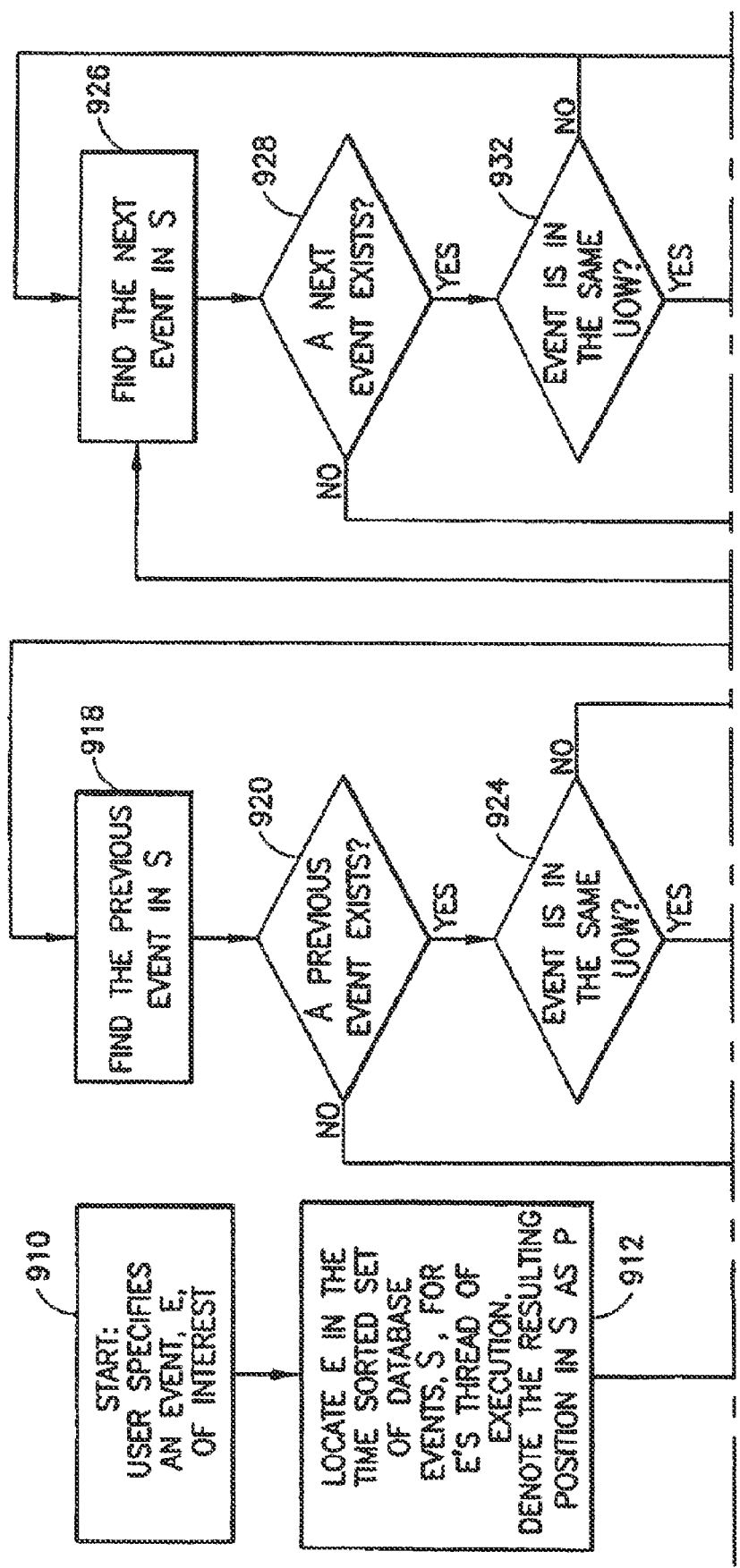
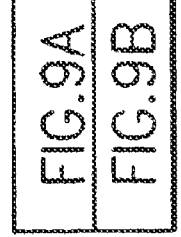

| | |
|---|---|
| CALL NAME | NAME OF THE METHOD/API CALL |
| ENTRY TIME | TIME STAMP FOR THE EVENT LOGGED BEFORE THE CALL IS MADE |
| EXIT TIME | TIME STAMP FOR THE EVENT LOGGED AFTER THE CALL IS MADE |
| HOST NAME | NAME OF HOST WHERE THE EVENT IS LOGGED |
| PROGRAM NAME | NAME OF THE PROGRAM BEING MONITORED |
| PROGRAM INSTANCE IDENTIFIER | RUNTIME PROGRAM INSTANCE IDENTIFIER (e.g.: PROCESS ID) |
| RESOURCE NAME (LEVEL 1) | LEVEL 1 SYSTEM RESOURCE RELATED TO EVENT (e.g.: QUEUE MANAGER) |
| RESOURCE NAME (LEVEL 2) | LEVEL 2 SYSTEM RESOURCE RELATED TO EVENT (e.g.: QUEUES) |
| RETURN CODE | METHOD/API CALL RETURN VALUE/COMPLETION CODE |
| STATUS CODE | METHOD/API CALL STATUS CODE |

FIG. 11

| | | | | | |
|---|---|---|---|---|---|
| 30d | 598 | | 44 | MQS CEI EXIT... 5814.1 | xcsHSHMEMBtoPT |
| 30d | 639 | | 41 | MQS FNC ENTRY.. 5814.1 | xllSpinLockReq |
| 30d | 684 | | 45 | MQS FNC EXIT... 5814.1 | xllSpinLockReq |
| 30e | 764 | | 80 | MQS FNC EXIT... | |
| 30d | 882 | | 118 | MQS SIGNALS BLOCKED WITH MASK: | |
| | | FFFFFFFF | | MQS DATA FROM xcsALLocateQuickCell Le | |
| | | 0000FFFF 00000000 | | 00000000 | |
| 30d | 956 | | 74 | MQS CEI ENTRY.. 5814.1 | xcsHSHMEMBtoPT |
| 30d | 1000 | | 44 | MQS CEI EXIT... 5814.1 | xcsHSHMEMBtoPT |
| 30e | 1040 | | 40 | MQS FNC ENTRY.. 5814.1 | xstALLocateCel |
| 30d | 1082 | | 42 | MQS FNC EXIT... 5814.1 | xstALLocateCel |
| 30e | 1125 | | 43 | MQS SIGNALS UNBLOCKED WITH MASK: | |
| 30e | 1222 | | 97 | MQS DATA FROM xcsALLocateQuickCell Le | |
| | | 00024007 00000000 | | 00000000 | |
| 30d | 1373 | | 151 | MQS FMC ENTRY.. 5814.1 | xllSpinLockRel |
| ... | | | | | |

FIG. 15
PRIOR ART

METHOD AND APPARATUS FOR CORRELATION OF EVENTS IN A DISTRIBUTED MULTI-SYSTEM COMPUTING ENVIRONMENT

CROSS-REFERENCE TO RELATED APPLICATIONS

The present application is a continuation of U.S. patent application Ser. No. 09/564,929, filed May 5, 2000, now U.S. Pat. No. 7,003,781.

FIELD OF THE INVENTION

The invention relates generally to methods and apparatus for correlating events attributable to computer programs residing on different computer systems in a distributed network, and more particularly relates to techniques and systems for tracing problem events to their source and facilitating their resolution.

BACKGROUND OF THE INVENTION

As the complexity of computer systems and networks of computer systems increase, it becomes more complex and time consuming to trace and resolve problems. This is especially true in large distributed systems where multiple computer programs are concurrently running in multiple computer systems.

Typically, experienced software developers are used to monitor each of these systems and combine the individual analyses in order to obtain a coherent, global view of the operation of the distributed data processing system.

In accordance with current methodologies this is a very manual and labor intensive process, and requires unique skills in the various computer operating environments that make up the distributed system. Furthermore, the inputs to the analysis, such as event and message tracing data, are not in common formats across the various systems. These factors combine to make it a very tedious, error prone, slow and costly process to attempt to correlate these various disparate data traces into a coherent model of the operation of the distributed data processing system.

Furthermore, the traditional error diagnosis processes typically employ a debugger, which is intrusive, or an embedded error logging facility, which normally requires that source code modifications be made.

The deficiencies of the prior art approach to problem identification and resolution have become more prominent as large scale distributed business enterprise systems have been developed, wherein a plurality of different applications running on different hosts and under different operating systems all cooperate via message passing techniques to process input data related to independent and asynchronous transactions. A type of management software known as "middleware" has been developed to control and manage the message flow and processing, and employs message queues to temporally isolate the various applications from one another. In such a system several thousand transactions may be simultaneously in process, resulting in corresponding thousands of Application Program Interface (API) calls and messages being concurrently generated and routed through the system.

As can be appreciated, identifying a cause of a failure or error condition occurring in one or a few of these transactions can be very complex, time consuming and, because of the significant amount of human operator analysis required, error prone.

OBJECTS AND ADVANTAGES OF THE INVENTION

It is a first object and advantage of this invention to provide a method and system for providing logical diagnostic information for events, such as API calls, call arguments and return values, for a distributed data processing system wherein transactions occur over a plurality of hosts and applications.

It is another object and advantage of this invention to provide a method and system for sensing and capturing, in a distributed manner, an occurrence of events including API calls, call arguments and return values, for automatically correlating captured events relating to a particular distributed transaction, and for displaying the correlated events to a human operator in a logically consistent manner.

SUMMARY OF THE INVENTION

The foregoing and other problems are overcome and the foregoing objects and advantages are realized by methods and apparatus in accordance with embodiments of this invention.

The teachings of this invention solve the above-mentioned problems by providing a uniform framework for capturing, managing, and correlating events from heterogenous environments. In a presently preferred, but not limiting, embodiment the teachings of this invention support the automatic correlation of IBM™ MQSeries™ (IBM and MQSeries are trademarks of the International Business Machines Corporation) API events, as well as a human user-assisted correlation of similar events, through an event modelling scheme and user management interface.

More specifically, this invention provides the following novel processes, systems and sub-systems.

In a first aspect this invention provides a design and implementation of an infrastructure for intercepting function calls, such as API calls, and generates events representing the corresponding function call from different computer programs in a distributed computing environment. This process is conducted in a non-intrusive manner. The infrastructure supports the conditional collection of a subset of event data through a data collection filter mechanism.

In a second aspect this invention provides a set of data structures for modeling function calls and data structures, software programs, and miscellaneous computer system resources (e.g., IBM™ MQSeries™ queue managers) of heterogeneous technologies. These data structures expose the event internals through a uniform set of interfaces.

In a third aspect this invention provides for the development and realization of the concept of event relations for modeling a message path relation between a send and receive event, which is an important element in an event correlation algorithm. An algorithm for the systematic examination of events and the generation of corresponding event relations is also provided.

In a fourth aspect this invention provides an interface built on top of an internal event model for exposing internal details of collected events through, for example, Microsoft COM object models.

In a fifth aspect this invention provides an algorithm for the automatic correlation of IBM™ MQSeries™ events from different software programs that are involved in the same local and/or business transactions.

In a further aspect this invention provides a mechanism to allow a human user to select a subset of collected events according to a set of evaluation criteria based on the event internal data. The user can achieve this selection through the use of a scripting language, such as Microsoft Visual Basic™ scripts, and a human interface.

These various aspects of the invention provide a unique perspective to manage the collection and correlation of events in a distributed computing environment in the following manner.

First, event collection is handled in a non-intrusive manner. That is, no additional work (source code modification, recompilation, linking, etc.) is needed on the monitored software programs for event generation. Moreover, a human user need not have any knowledge of the internals of the software programs that he/she is monitoring. This contrasts favorably with the traditional diagnosis process, including those that use the debugger (intrusive) or the embedded logging (through source code modifications) approaches.

Second, event collection, for example performed by a computer system, can be triggered by the fulfillment of a set of criteria based on, for example, software program running states and computing environments. IN other words, event collection is in general "disabled" for avoiding any interruption of normal program execution, and then automatically enabled for responding to an error condition of a change in program states or environments. When enabled by the triggering event(s), the sensor can send all event data that satisfies a specific data collection filter.

Third, an amount of data to be collected from the software programs can be decided both statically (through pre-programmed filtering conditions) and dynamically (such as from certain environment and program states).

Fourth, the human user can control the monitoring activities in a distributed computing environment from one central console.

Fifth, event correlations for transaction analysis can be accomplished using an automatic correlation mechanism, thereby eliminating or reducing the involvement of highly skilled software programmers.

Sixth, a user interface is provided for enabling a human user or operator to visualize and analyze subset(s) of events selected by user-defined selection criteria. In the presently preferred embodiment these selection criteria are defined through the use of Microsoft Visual Basic™ scripts. The operator has the ability to modify and customize the scripts to tailor the presentation to a desired format and content. The script may also be automatically generated by entry of data into a few fields in a presentation filter dialogue box.

A method and system is therefore disclosed for monitoring an operation of a distributed data processing system. The system is a type of system that includes a plurality of applications running on a plurality of host processors and communicating with one another, such as through a message passing technique. The method has steps executed in the plurality of applications for: (a) examining individual ones of generated Application Program Interface (API) calls to determine if a particular API call meets predetermined API call criteria; (b) if a particular API call meets the predetermined API call criteria, storing all or a portion of the content of the API call as a stored event; (c) processing a plurality of the stored events to identify logically correlated events, such as those associated with a business transaction; and (d) displaying all or a portion of the stored API call content data for the logically correlated events. The API call criteria can include, by example, system entity identity, the API name, timing data and/or restrictions on parameter values to the API call. The step of displaying preferably includes a step of processing the stored API call content data for the logically correlated events using a script (pre-programmed, automatically generated, or operator-defined). The step of examining includes initial steps of: installing a sensor between an output of the application and a function call library for emulating, relative to the application, the interface to the function call library; and storing the predetermined API call criteria in a memory that is accessible by the sensor. The step of examining then further includes steps of intercepting with the sensor an API call output from the application; determining if the intercepted API call fulfills the stored predetermined API call criteria; and, if a match occurs, capturing data representing all or a portion of the content of the API call and transmitting the captured data to a database for storage as the stored event.

BRIEF DESCRIPTION OF THE DRAWINGS

The above set forth and other features of the invention are made more apparent in the ensuing Detailed Description of the Invention when read in conjunction with the attached Drawings, wherein:

FIGS. 2-10 are each a logic flow diagram or a logic model, wherein

FIG. 2 depicts sensor work flow;

FIG. 3 depicts an analyzer data logic model;

FIG. 4 depicts an analyzer logic model;

FIG. 5 depicts analyzer new event handling work flow;

FIG. 6 depicts analyzer event relation generation flow;

FIG. 7 illustrates a COM model interface;

FIG. 8 illustrates a presentation data filtering operation;

FIG. 9 illustrates a first embodiment of transaction correlation;

FIG. 10 illustrates a second embodiment of transaction correlation;

FIG. 11 is a table that illustrates a number of exemplary standard event attributes, and is referenced below in the description of the data model of FIG. 3;

FIG. 15 shows an exemplary content of a log file used to record message traffic after a tracing facility is enabled;

DETAILED DESCRIPTION OF THE INVENTION

Figure 1:
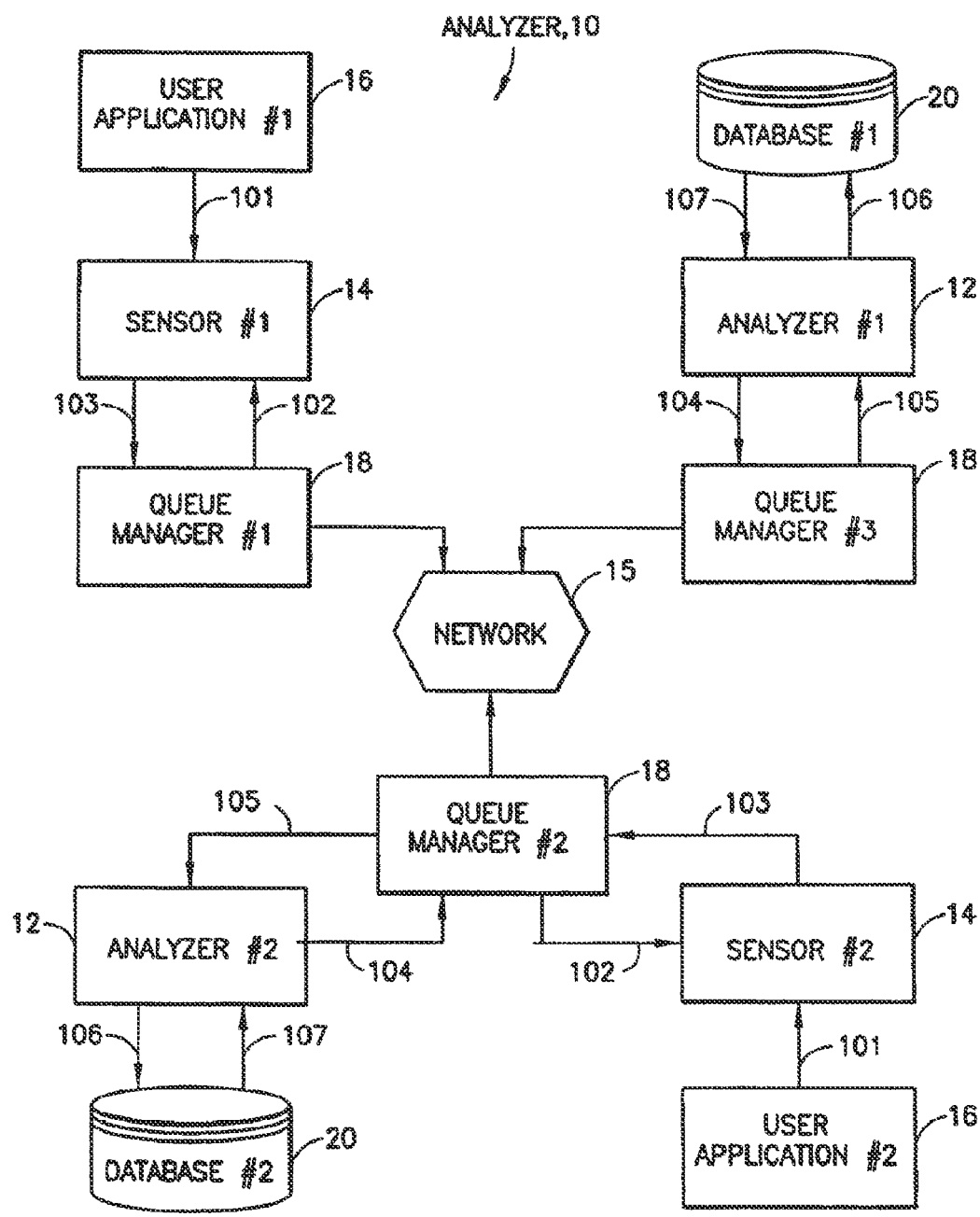
FIG. 1 is block diagram illustrating an exemplary monitoring environment in accordance with the teachings herein.

FIG. 1 illustrates an exemplary analyzer monitoring environment. An analyzer system 10 in accordance with the teachings herein comprises two major sub-systems: an analyzer 12 (also referred to herein as an analyzer console) and a plurality of sensors 14. The sensors 14 may be considered as agents that reside in the space of a monitored process, and operate to collect information on calls of the particular technology that a particular sensor 14 is monitoring.

Figure 12:
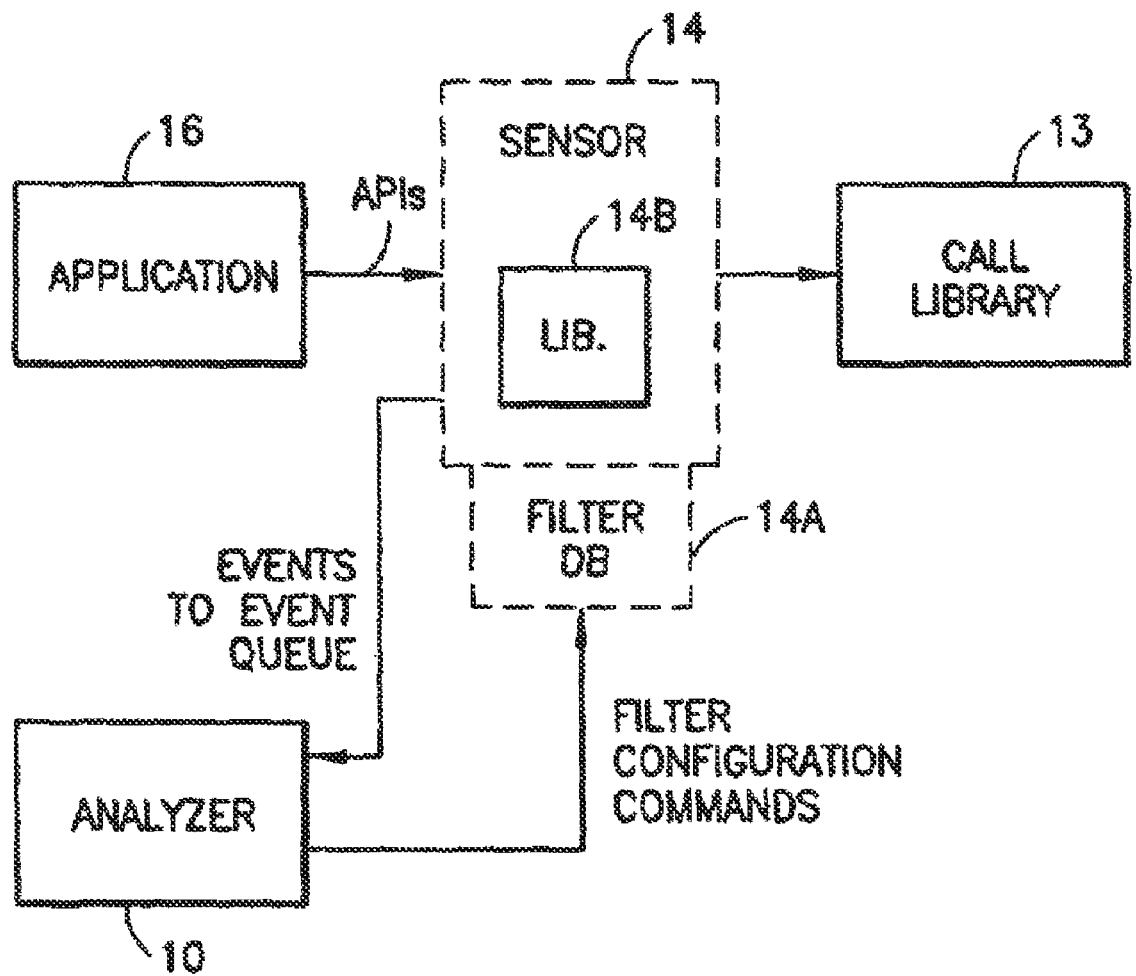
FIG. 12 is a simplified block diagram illustrating a relationship between a sensor, an application, and a call library emulated by the sensor.

Referring briefly to FIG. 12, for Microsoft and UNIX™ Platforms (UNIX is a trademark of X/Open Company, Limited) a sensor 14 library 14B implements all of the API entry points for the technology that the particular sensor 14 monitors. The sensor library 14B is named exactly as a standard call library 13, and is installed in a manner such that any monitored process or application 16 will interface at runtime with the sensor library 14B, instead of the standard library 13. This process is conducted in a non-intrusive manner and does not require any additional recompilation or relinking of the user application.

For an OS/390™ platform (OS/390 is a trademark of the International Business Machines Company), in particular for the MQSeries™, a different approach makes use of the crossing exit mechanism provided by CICS™ (CICS is a trademark of the International Business Machines Company). This approach also maintains the non-intrusive manner of the sensor 14 injection process.

Referring also to FIG. 1, during the execution of the user application 16, control is passed via path 101 to the associated sensor 14 whenever a monitored API is invoked. In response, the sensor 14 performs the necessary work to generate an event representing the API call state. The generation of the event is triggered by the API fulfilling requirements stored in a sensor configuration filter 14A (FIG. 12), which is programmed with configuration commands or messages by the analyzer 10.

A human operator employs the analyzer console 12, also referred to as the analyzer user interface (UI), for controlling the activities of the sensors 14, for visualizing the collected event data, and for performing data analysis. The analyzer console 12 sends out the sensor 14 configuration messages through a MQSeries™-based asynchronous communication network 15. This process is illustrated by path 104 (analyzer to Queue Manager/Queue 18) and path 102 (Queue Manager/Queue 18 to sensor 14) in FIG. 1. The sensor 14 also makes use of the same communication network 15 to pass captured event(s) to the analyzer console 12 via paths 103 and 105. The collected events are stored in a local event database 20 associated with the analyzer 12, via paths 106 and 107.

Figure 2:
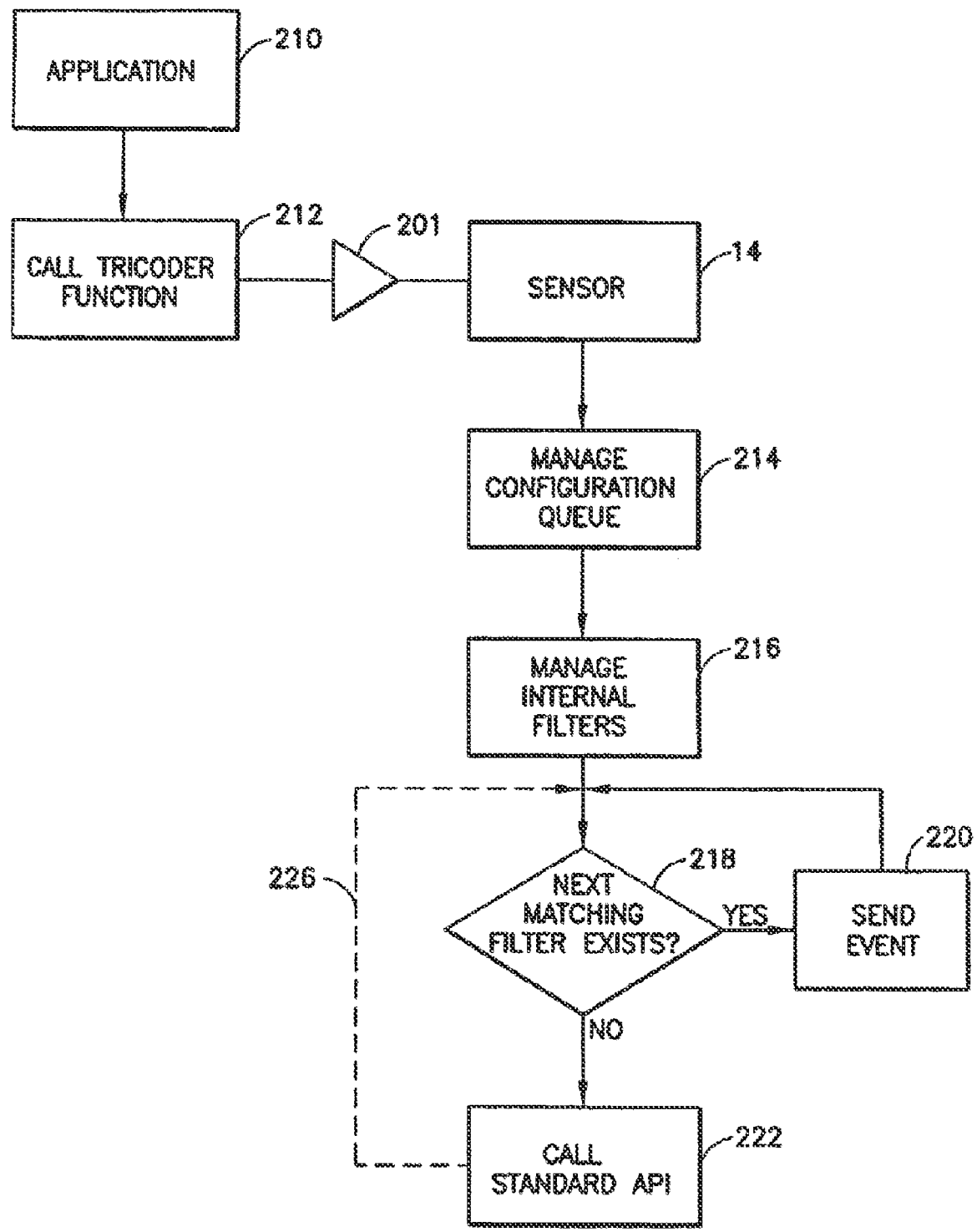

FIG. 2 illustrates the control flow of the sensor 14. At step 210 an application 16 makes a function call belonging to the set of functions monitored by the associated sensor 14. In the preferred embodiment, at step 212, a tricoder function is invoked instead of the standard function. A tricoder function yields program control to the sensor 14 via path 201 for analyzer 10 related processing.

In step 214, the sensor 14 first manages the configuration database 14A, also referred to herein as a configuration queue, in the analyzer communication network 15. This management function includes examining received configuration messages on the configuration queue, removing expired messages, and retrieving newly arrived messages. At step 216 the sensor 14 examines each of the newly arrived messages retrieved from step 214 and updates the internal data structures. Each configuration message contains a set of data collection filter rules. These rules determine the conditions which trigger event generation/reporting, as well as an amount of information to be collected from the event data packet. The filter rule conditions are preferably based on system entity identity (e.g., software program name, host machine name, queue manager name, etc.), API name, timing information, and/or restrictions on parameter values to the API call, as described in further detail below.

At step 218 the sensor 14 determines if any of the existing filter rules match the current program state.

If there is a matching event, the sensor 14 generates the event, thereby capturing the state of the triggering function call (step 220). If there is no matching event, at step 222 the sensor 14 instead invokes the standard API. The sensor 14 subsequently returns control to the application 16.

The amount of information contained in the generated event depends on the filter rule specification. The filter rule specification determines whether function call parameters are to be sent, and the range of user data to be carried along with the event packet. For example, a particular packet may include some thousands of bytes of user message, and the filter rule specification may cause only the first 16 bytes to be captured and stored as part of the event, or may specify that none of the user message data be captured and saved. The filter rule specification(s) thus controls the type and amount of data that is captured and stored upon the filter rule matching the current program state.

In some cases the amount of captured data may be made dynamic, e.g., as a function of the current environment or operating state of the system/processor being monitored.

It is also possible to repeat steps 218 and 220 after the standard API call returns control to the sensor 14, in order to generate an event representing the post-call state. This recursion is indicated by the dashed line 226.

Figure 3:
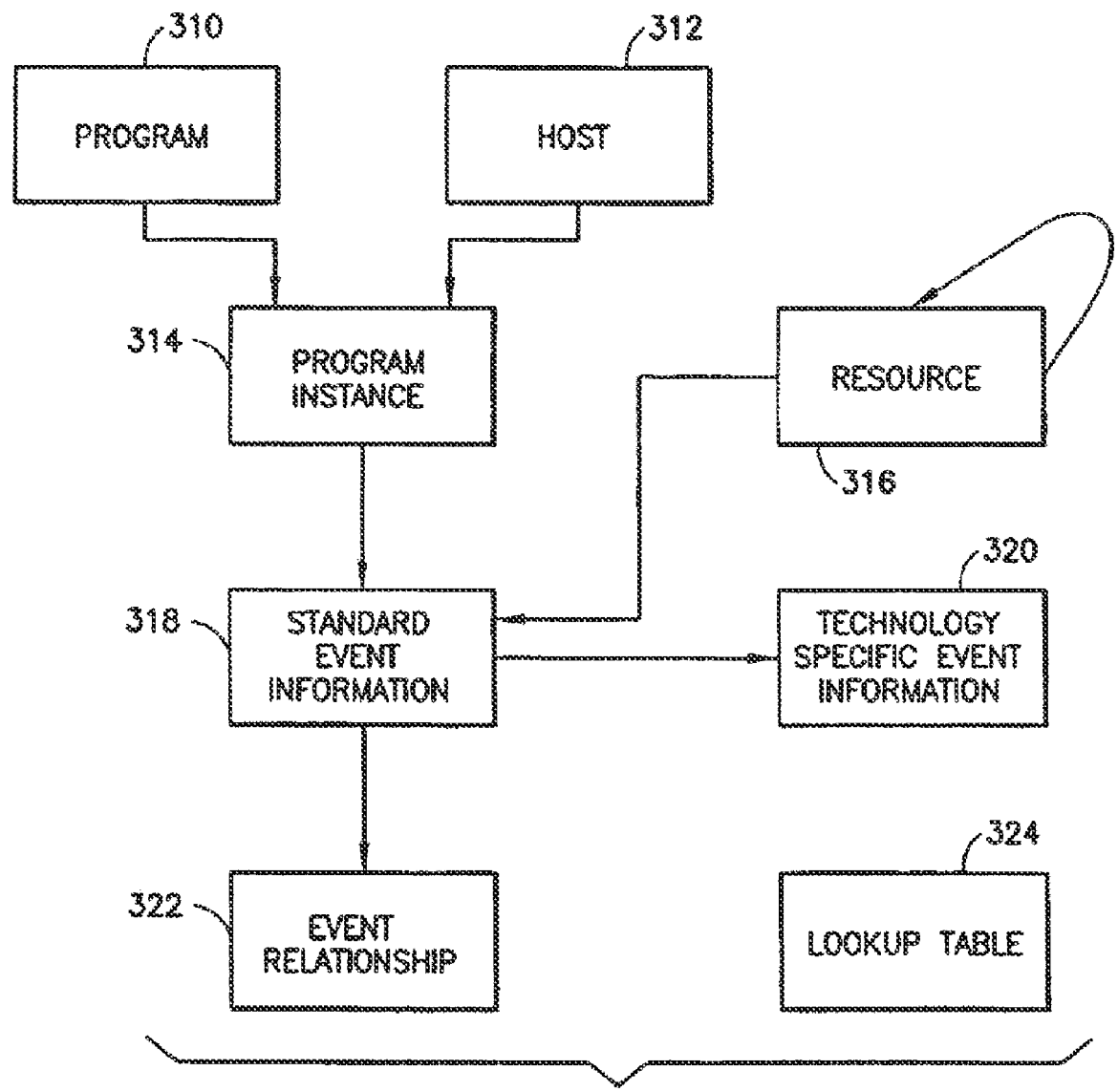

FIG. 3 illustrates the data model used by the analyzer system 10 to store and represent the function call states and monitored environment in a hierarchical/networked manner. The program 310, host 312, and program instance 314 data types represent the system entities in a monitored environment, where an entity is any object in the monitored system that exists for a certain length of time. Note that a program instance 314 is always associated with a program 310 and a host machine 312. The program instance 314 can be considered as a process and thread of execution in a UNIX™/Microsoft Windows™ environment (Windows is a trademark of the Microsoft Corporation), and as a region-transaction-task in the OS/390™ CICS™ environment.

A resource 316 is an entity that is specific to a particular technology monitored by the analyzer 10. For example, for the MQSeries™, the queue manager and the queues are considered to be a resource 316. One type of resource 316 can be associated with another (e.g.: Queue Manager and the associated Queue, shown collectively as 18 in FIG. 1).

An event entry represents the captured state of a function call collected by one of the sensors 14 in the system 10. That is, it is the internal storage for the event packets collected from different sensors 14. An event entry is associated with a program instance and optionally one or more resources. The event data can be divided into two groups: standard or technology neutral event information 318 and technology specific event information 320. The former includes information that is common among different technologies. FIG. 11 is a table that illustrates a number of exemplary standard event attributes. It should be noted that the entity origin information including host name, program name, program instance identifier, and resource name (level 1 and level 2) can be accessed through the entity and resource entries associated with the respective event entry.

The technology specific event information 320 contains function call parameters and a user data buffer. User data refers to the information particular to the application 16, and not the technology and function set. The technology specific event information 320 is divided into two sections, one covers the data captured before the standard function call (entry data), and one covers the data captured after the standard function call (exit data).

Each event entry is associated with a group of event relationships 322. There can be different types of relationships defined for events. One important type of relationship considered by the analyzer 10 of this invention is the message path relation. The message path relation associates events that serve as the source and destination of a message transaction between two entities in the monitored system. The concept of message path relation is generic for different technologies, and is realized by a specific relationship type for each technology monitored by the analyzer 10. As an example, for the MQSeries™ it is realized by the MQPUT-MQGET type relation that associates MQPUT/MQPUT1 and MQGET calls dealing with the same message. In general, an MQPUT call puts data on a queue, while the MQGET call takes data from a queue.

A lookup table 324, similar to a hash table, is used for storing key-value mapping. Each entry in the lookup table 324 contains at least a technology name, a key type, a key value, and value list. The value list contains a set of events that bear the same key value. For the MQSeries™ example, the key type is based on a combination of Message ID, Correlation ID, and Message Time. This allows the analyzer 10 to group MQPUT/MQPUT1/MQGET events bearing the same message ID, correlation ID, and message time, and to then look up the event in an efficient manner. This is particularly useful for deriving a message path relation.

Figure 4:
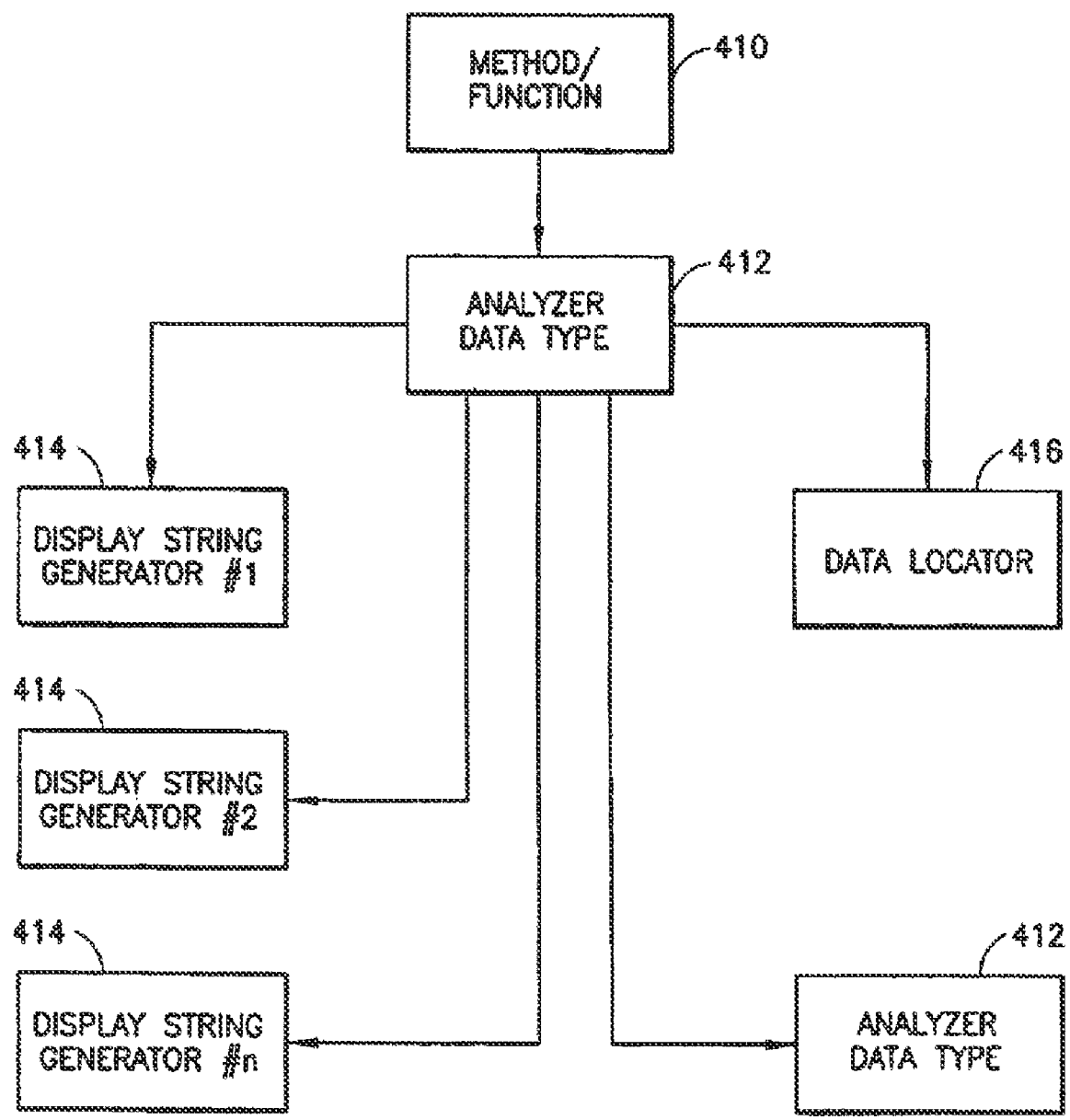

FIG. 4 illustrates the logic model 718 (see FIG. 7) defined for the analyzer 10. Recalling first that event data can be divided into a standard and technology specific section, the data format for the technology-specific section is different for different technologies. The analyzer 10 logic model provides a uniform way for exposing the technology specific data to different components of the analyzer 10. As was indicated previously, the technology-specific event data section in the data model covers the function call parameters and the user data buffer. Call parameters bear different data types specific to the corresponding technology. Moreover, it is possible that the user data buffer may have embedded structures of technology-specific data types. The analyzer logic model 718 is comprised of a Method/Function 410 and an analyzer data type 412.

The analyzer logic model 718 defines a class BCMethod for representing any API or class methods. BCMethod objects store the call parameter names and corresponding analyzer logic model data type (described below).

The analyzer logic model 718 also defines the base class BCType for representing any technology-specific data types. A BCType (or derived class) object contains one or more display string generators 414 and a data locator 416.

A given one of the display string generators 414 contains functions for producing a string formatted in a particular way for display purposes. It is defined by a display format string and the logic for generating such a string. The data locator 416 aids in determining the exact location of the runtime data for a particular call parameter and type in the technology specific event data section. By combining the data locator 416 and the runtime event data, the analyzer 10 is enabled to access any call parameter value in an event record. The display string generator 414 associated with the BCType object can then make use of this data pointer and produce the string representing the parameter value.

It should be noted that the string being generated need not be tied with any technology-specific detail, and hence can be used and understood by the technology neutral components of the analyzer 10.

On the other hand, other components (e.g., an analyzer filter manager as described below) can use the data locator 416 to refer to the technology-specific raw event data value. In this case, the analyzer component utilizes a technology helper library designed specifically for the corresponding technology to interpret the event value.

Different derived classes based on BCType are designed to cover different technology data types or classes, as now described.

A first technology data class is a BCBasicType (derived from BCType). This class represents any atomic native data type. That is, the native data type cannot be broken into other native data types. For example, fundamental data types such as 'integer' and 'character' can be represented by BCBasicType objects. This class can optionally carry definitions of mapping between integer/character values and meaningful enumerator strings. Many times such integer or character constant values are represented by a human readable enumerator string (e.g.: MQCC_OK(0) in the MQSeries™ completion code definitions). The BCBasicType class contains information relating to this type of mapping.

A second technology data class is a BCCompoundOptionType (also derived from BCBasicType), which is similar to BCBasicType. This class allows mapping of multiple enumerator names to a single value.

A third technology data class is a BCEnumType (also derived from BCBasicType). This class is also similar to BCBasicType except that it is not applied to any runtime event value. Instead, it provides a static definition of enumerators. This can be useful to represent the enumerator concepts in programming languages such as C++.

A fourth technology data class is a BCCompositeType (derived from BCType). This class type serves as a container class and contains reference to other BCType objects and BCMethod objects. The BCCompositeType can be used to model classes and structures in most conventional programming languages such as C, C++, Java, etc.

A fifth technology data class is a BCArrayType (derived from BCType). This type is used to model the array type in conventional programming languages. It is preferably always associated with a BCType class that refers to the data type the array type builds on top of, and it provides a mechanism for accessing a particular element in the array of runtime event data.

A sixth technology data class is a BCPointerType (derived from BCType). This type is used to model the pointer type in programming language such as C and C++. It is preferably always associated with a BCType class that refers to the data type the pointer type is associated with.

A seventh technology data class is a BCDynamicType (derived from BCType). This type is used in situations where the layout of the data may vary according to the runtime event data. For example, and referring again to the MQSeries™ example, it is possible to have different MQSeries™ structures embedded in the user data buffer. The BCDynamicType has the capability of generating runtime children type objects to reflect the event data layout.

Figure 5:
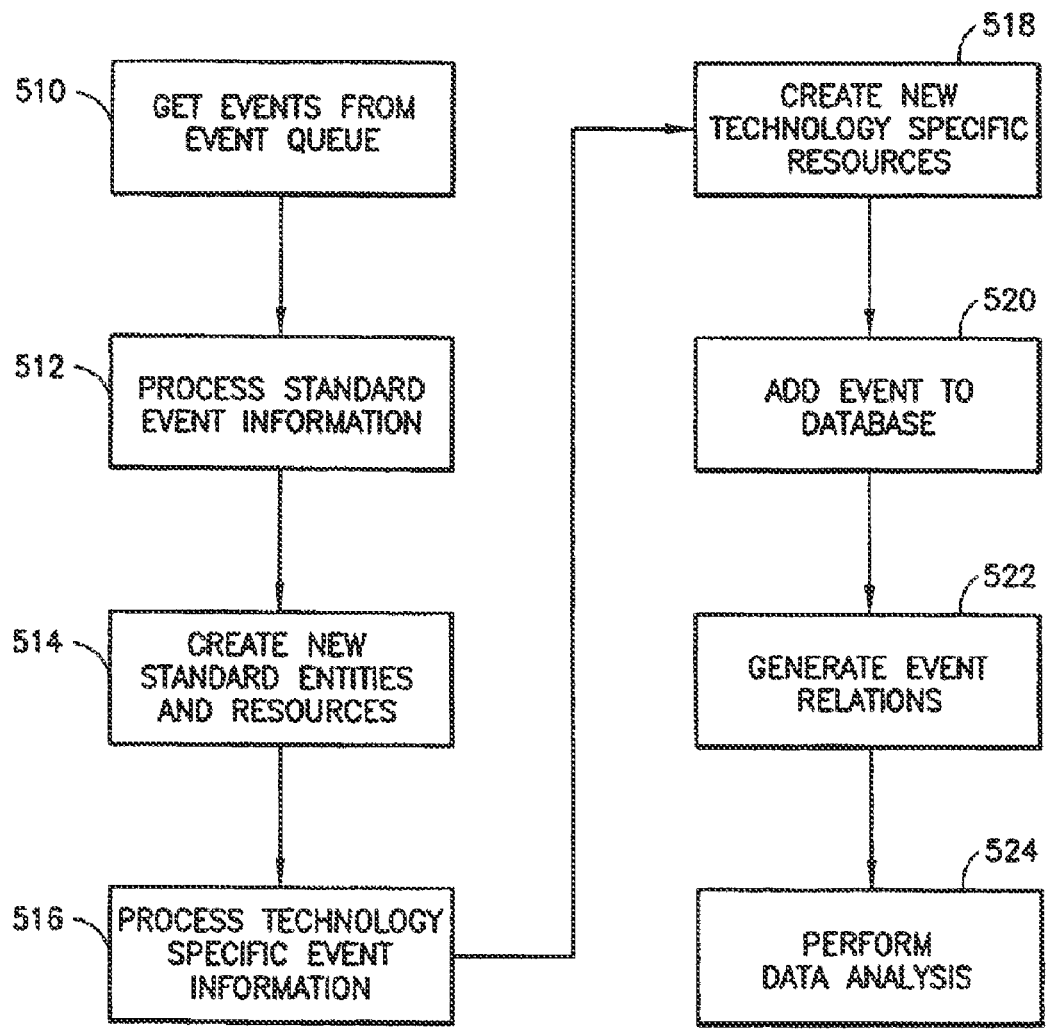

FIG. 5 is a logic flow diagram that illustrates the work flow of the analyzer 10 for handling a new incoming event. Operation of the analyzer 10 begins with different threads of execution. Within an individual thread, at step 510, the analyzer 10 collects events originated from one or more particular sensors 14. The event queue distribution scheme is based on the sensor configuration messages. In other words, the configuration message to a particular one of the sensors 14 defines the event queue that the sensor 14 should report to.

For each event collected, at step 512 the analyzer 10 performs any necessary data conversion and processing on the received data. Data conversion includes (but is not necessarily limited to) integer and floating point encoding conversion and character code set conversion. The goal is to ensure all incoming event data is saved in one standard format.

At step 514 any new entity and resource entries are created accordingly, based on the extracted standard event information 318, and at step 516 the analyzer 10 proceeds to invoke the appropriate technology-specific logic to process the technology-specific event information 320. This step primarily deals with data conversions. At step 518 any new technology-specific resources are created accordingly based on the new data. At step 520 a new entry in the analyzer 10 database is created for the event information, while at step 522 event relations are generated for the newly added event (described below in relation to FIG. 6). Finally, at step 524 the appropriate data analysis tasks are performed on the newly added event data.

Figure 6:
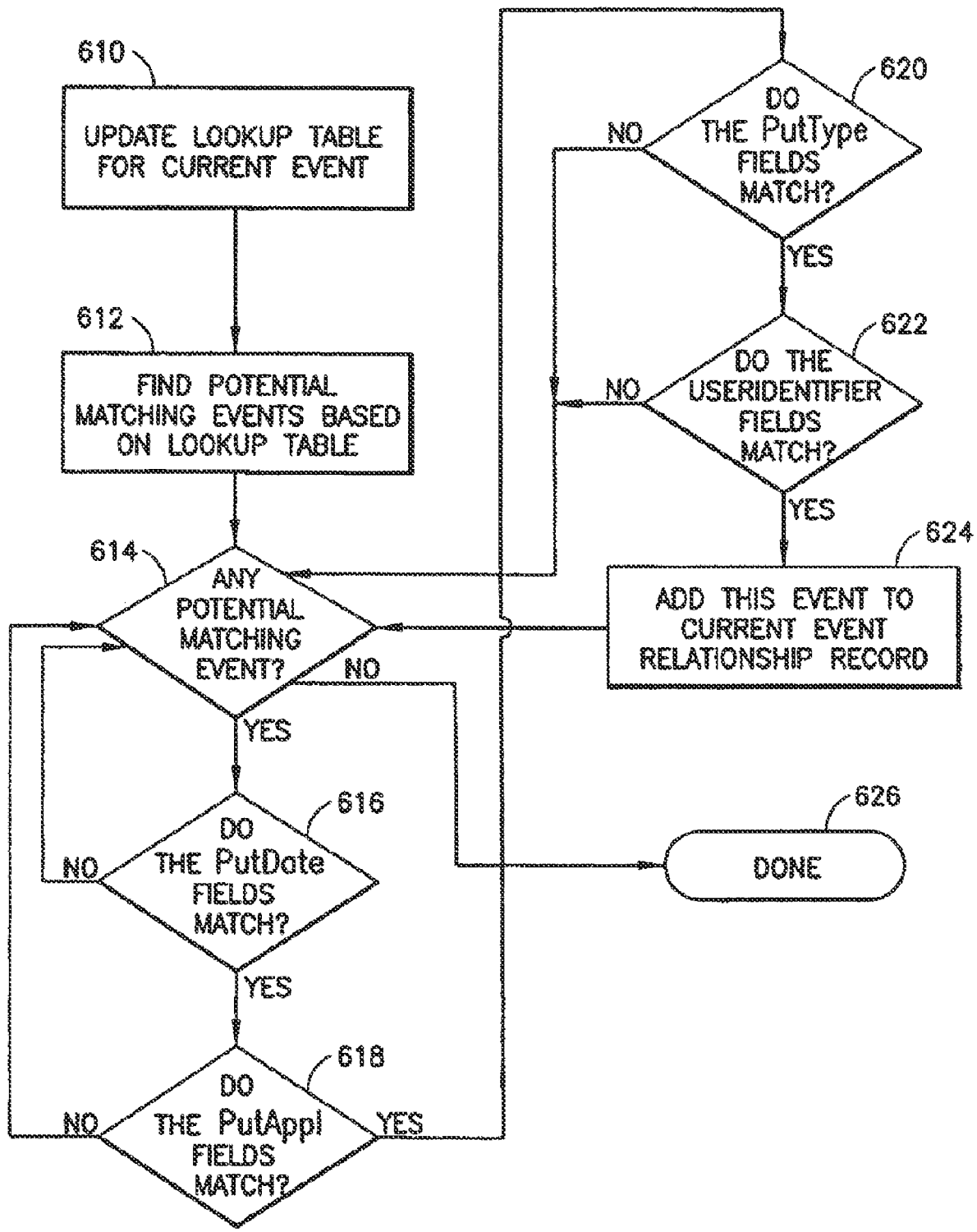

FIG. 6 illustrates the control flow for the above-mentioned event relation generation step 522. Before describing the various steps of this method, it should be noted that, in general, message path relations are generated for any technology. As described before, for the MQSeries™ the message path relation is primarily based on the MQPUT/MQPUT1 and MQGET relations. The underlying rationale of this process is to match any MQPUT/MQPUT1 and MQGET calls referencing the same message at the source and at the destination. Since an MQGET can be invoked in a destructive or browsing mode, it is possible that there may be more than one non-browsing MQGET event for a given MQPUT/MQPUT1 event.

Several fields in the MQMD structure form what is known as the identity and origin context. This provides information on the origin of the corresponding message. This information includes the following elements:

UserIdentifier: identifies the user that generates the message;
AccountingToken: a security token associated with the message;
ApplIdentityData: additional user-defined data supplied with the message;
PutApplType: a type of application (platform information) that generates the message;
PutApplName: a name of the application that generates the message;
PutDate: the date when the message is put on a queue; and
PutTime: the time when the message is put on the queue.

The application that puts the message can decide whether the information is to be generated fresh by the queue manager, copied from previous MQGET call, customized by the application itself, or is void, i.e., no origin context information is to be generated.

In the first case, i.e., the information is to be generated fresh by the queue manager, the origin context provides strong evidence whether the MQPUT/MQGET calls match. However, the same is not true for the other three cases. For example, the application may be "propagating" messages it receives to other recipients, and in this case it may decide to pass on the origin context, rather than generating a new context.

The Message and Correlation IDs provide a unique identity for individual messages. This information can be generated by the queue manager, or it can be supplied by the application. Again, in the first case, i.e., the information is to be generated fresh by the queue manager, the analyzer 10 can ensure the uniqueness of the message in the matching process. However, the same does not necessarily apply in the latter cases. For example, the application may have a logical error and generate the same Message and Correlation ID for all messages.

Describing FIG. 6 now in further detail, at step 610 the analyzer 10 updates the lookup table 324 (FIG. 3) for the current event. The key for the lookup table 324 comprises the message ID (24 bits), the correlation ID (24 bits), and the message put time (16 bits). At steps 612 through 622 a search is made to determine if any lookup table 324 entry already exists with this key value. If not, the method creates a new lookup table entry and exits at step 626. If a lookup table 324 entry already exists with this key value, then at step 624 the method adds the current event to the value list associated with the matching key.

In more detail, at step 612 the analyzer 10 locates the lookup table entry with the same key as the current event, and retrieves the list of associated events. At step 614 the method checks for a potential matching event, i.e, a check is made to determine if there is any potential matching event generated from step 612 that has not been examined yet. If there is no further event, the process is completed (step 626). Otherwise, the method performs the following steps to confirm whether the new event actually matches the current event in a MQPUT/MQGET relation.

At step 616 a check is made to determine if the PutDate fields match, i.e., if the PutDate field in the MQMD structure for the current event and a matching candidate event match. If not, the method returns to step 616 for a next potential matching event.

If the PutDate fields match, flow continues to step 618 to determine if the PutAppl fields match, i.e., if the PutAppl field in the MQMD structure for the current event and the matching candidate event match. If not, the method returns to step 616 for a next potential matching event.

If the PutAppl fields match, flow continues to step 620 to determine if the PutType fields match, i.e., if the PutType field in the MQMD structure for the current event and the matching candidate event match. If not, the method returns to step 616 for a next potential matching event.

If the PutType fields match, flow continues to step 622 to determine if the UserIdentifier fields match, i.e., if the UserIdentifier field in the MQMD structure for the current event and the matching candidate event match. If not, the method returns to step 616 for a next potential matching event.

Assuming that the UserIdentifier fields also match, at step 624 the method confirms the matching event relation by declaring the candidate event from the lookup table 324 as a matching event to the current event, and correspondingly updates the associated event relation record. Flow then returns to step 614 to process the next potential matching event.

In other embodiments of this invention more or less than these particular fields may be used to establish an event match/non-match condition.

Figure 7:
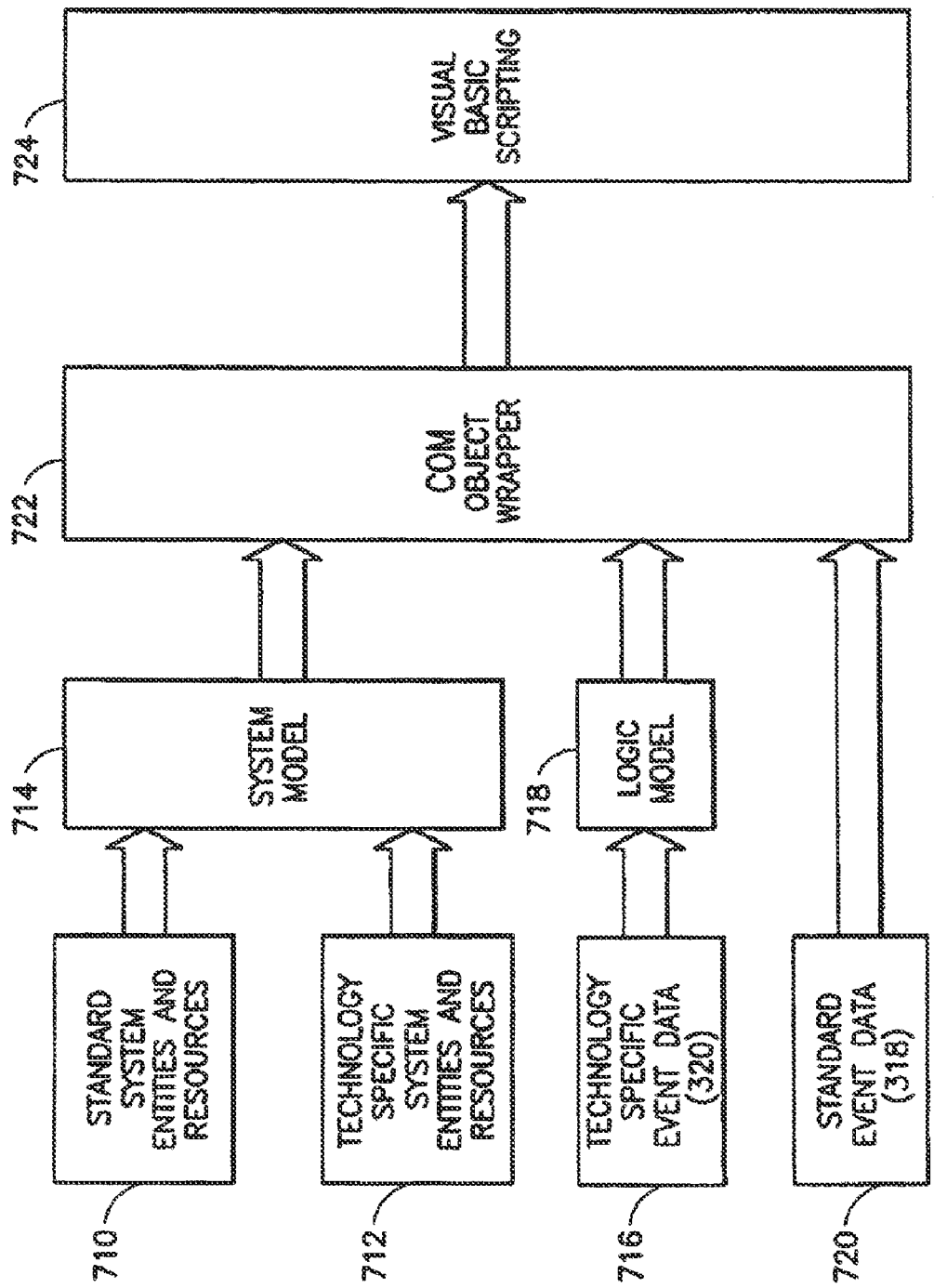

FIG. 7 illustrates a presently preferred analyzer 10 COM model interface, and more specifically shows a relationship between the analyzer 10 logic model 718 and system model 714, and a COM object wrapper layer 722.

The analyzer 10 logic model 718 provides a mechanism to represent different technology functions and data structures in a uniform manner. The resource model, part of the analyzer 10 system, provides a technique to represent the technology-specific entities. That is, the logic model 718 and the system model 714, when taken together, represent the monitored system environment and activities.

The display string generation capability (blocks 414 of FIG. 4) provided by the BCType class in the logic model 718 enable the analyzer 10 components to illustrate the event data value in a technology-neutral fashion. However, this does not in and of itself enable the human user to manipulate the event data in data analysis or other tasks.

Scripting languages such as VBScript and Jscript provide a means to the programmer to create objects in compiled languages such as C and C++, which are accessible to the scripting language. VBScript uses the Microsoft COM automation interface to call into any programmer defined objects from within a script. The Microsoft COM model is used to allow a human user to programmatically manipulate the event data, which may be stored on computer readable storage medium such as a database 20 (FIG. 1), among other things. Thin "wrapper" objects based on the COM automation model are implemented on top of the logic model 718 and the system model 714. Through the COM automation interface, programs or scripts can be written to access the event data in a consistent manner. By employing the Visual Basic™ Scripting support, the human user can design a script, which can be executed on a computer system, that handles the COM wrapper objects. The scripts can be designed by the user to filter the set of events to be seen in the analyzer 20 human user interface (referred to as presentation filtering), or to perform other data analysis tasks. The scripts may also be automatically generated, for example by a computer system, by entry of data into a few fields in a presentation filter dialogue box.

FIG. 7 shows the hierarchical relationship between the standard system entities and resources 710, the technology-specific system entities and resources 712, and the analyzer 10 system model 714. Also shown is the technology-specific event data 716 (320), which feeds into the logic model 718. The outputs of the system model 714, the logic model 718, and standard event data 720 (318) are all inputs to the COM object wrapper 722, which in turn provides an output to the Visual Basic™ scripting unit 724.

Figure 8:
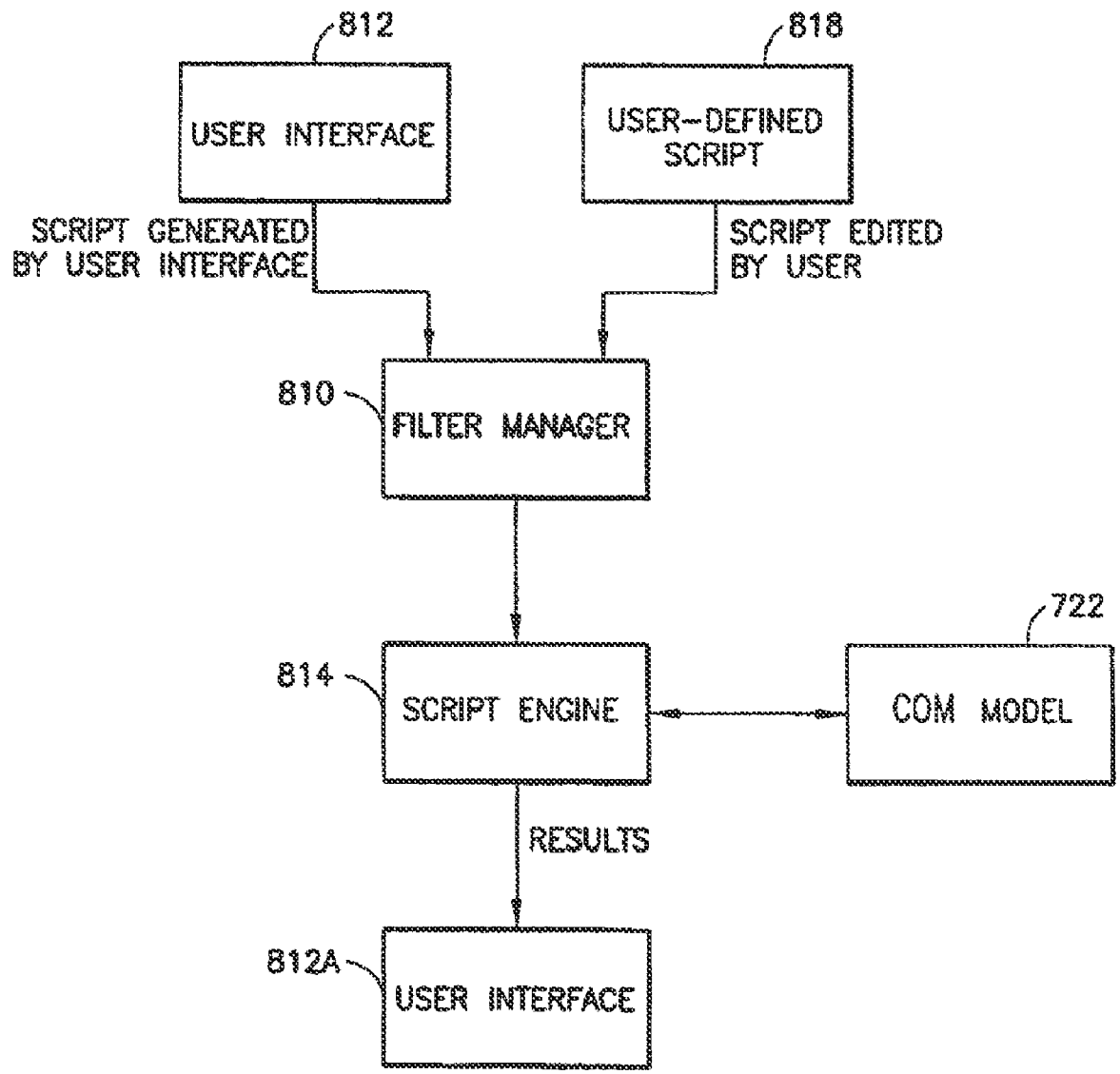

FIG. 8 illustrates the relationship between presentation data filtering logic and the COM object wrapper layer 722.

A filter manager 810 provides a portion of a simple user interface 812 for users to search and filter on certain criteria. This user interface generates a Visual Basic™ script, which contains a set of rules corresponding to the selections made by the user. The generated script, via a script engine 814, uses the COM object wrapper 722 to access analyzer internal components such as the logic model 718, the system model 714 and the database 20 (FIG. 1) to retrieve and filter data.

There may be times when the user interface 812 is not sufficient to perform advanced searches. In that case, the user can edit the generated script, generating user-modified or user-defined script 818, and leverage the power of Visual Basic™ to provide additional rules and conditions. For example, part of the user data message captured by a particular sensor 14 may include a particular date of interest (e.g., a date, that a previous loan obligation was satisfied). By knowing the number of bytes that this date is offset into the captured user message portion, the user can modify the script to specifically look for a date at this location in the event data region that meets some criterion (e.g., the date must be earlier than the current date, otherwise an error condition exists).

In any case, once the script is obtained, either from the user interface 812 or the user 818, the filter manager 810 invokes the Visual Basic™ scripting engine 814 to execute the script. As the script executes on a computer system, the scripting engine 814 invokes the COM objects provided by the analyzer COM model 722 to access the event data stored on computer readable storage medium, such as a database 20 (FIG. 1). The results of the script are placed in another COM object (shown as well as the COM model 722). The filter manager 810 accesses the results COM object and then passes the data back to a display or presentation portion 812A of the user interface, where the results of the script are displayed in, for example, a list format. Other types of scripts and scripting engines could be employed as well, and the teachings of this invention are not limited to using only Visual Basic™.

The following is an example of a VBScript script generated by the filter user interface. In this case, the user input was to search the collected event data for all API "MQPUTs" which had a return code (parameter 7) of "MQCC FAILED".

"EvdntsPool" is an analyzer 10 object which iterates through the event database. For each iteration, the object "esevent", which contains event data, is created and filled in from the database. The "esevent" object contains methods and properties to access event data such as API name ("Method" property), host name ("Host" property), and other attributes. The "method" object in turn contains properties and values to get data from each parameter value. These methods and properties eventually call into the analyzer 10 logic and system models. In this example, the seventh parameter of "MQPUT" is the return code. The "If" statement checks for the value of the parameter being equal to "MQCC FAILED". The "UIEvents" object is a list of events, and the output back to the analyzer 10 user interface. If the condition matches, the event is added to the "UIEvents" list of events to be displayed in the analyzer 10 user interface 812.

MQCC FAILED=2
For Each esevent In EventsPool
   Set method=esevent.Method
   paramvall=Null
   If (esevent.Method.Name="MQPUT") Then
     paramvall=method.GetParamValue(7).Val
   End If
   If ((paramvall=MQCC FAILED)) Then
     UIEvents.Add(esevent)
   End if
Next The user could customize this simple script to perform more powerful conditional filtering. For example, if the user desires to search for events which have a result code of "MQCC FAILED" or of "MQCC WARNING", the user could modify the script above as follows:

MQCC WARNING=1
MQCC FAILED=2
For Each esevent In EventsPool
   Set method=esevent.Method
   paramvall=Null
   If (esevent.Method.Name="MQPUT") Then
     paramvall=method.GetParamValue(7).Val
   End If
   If ((paramvall=MQCC FAILED) OR (paramvall=MQCC WARNING)) Then
     UIEvents.Add(esevent)
   End If
Next Another use of the script could be to export selected data into files or to other applications which use the COM automation interface (722, FIGS. 7 and 8), such as Microsoft Excel™.

Figure 9B:
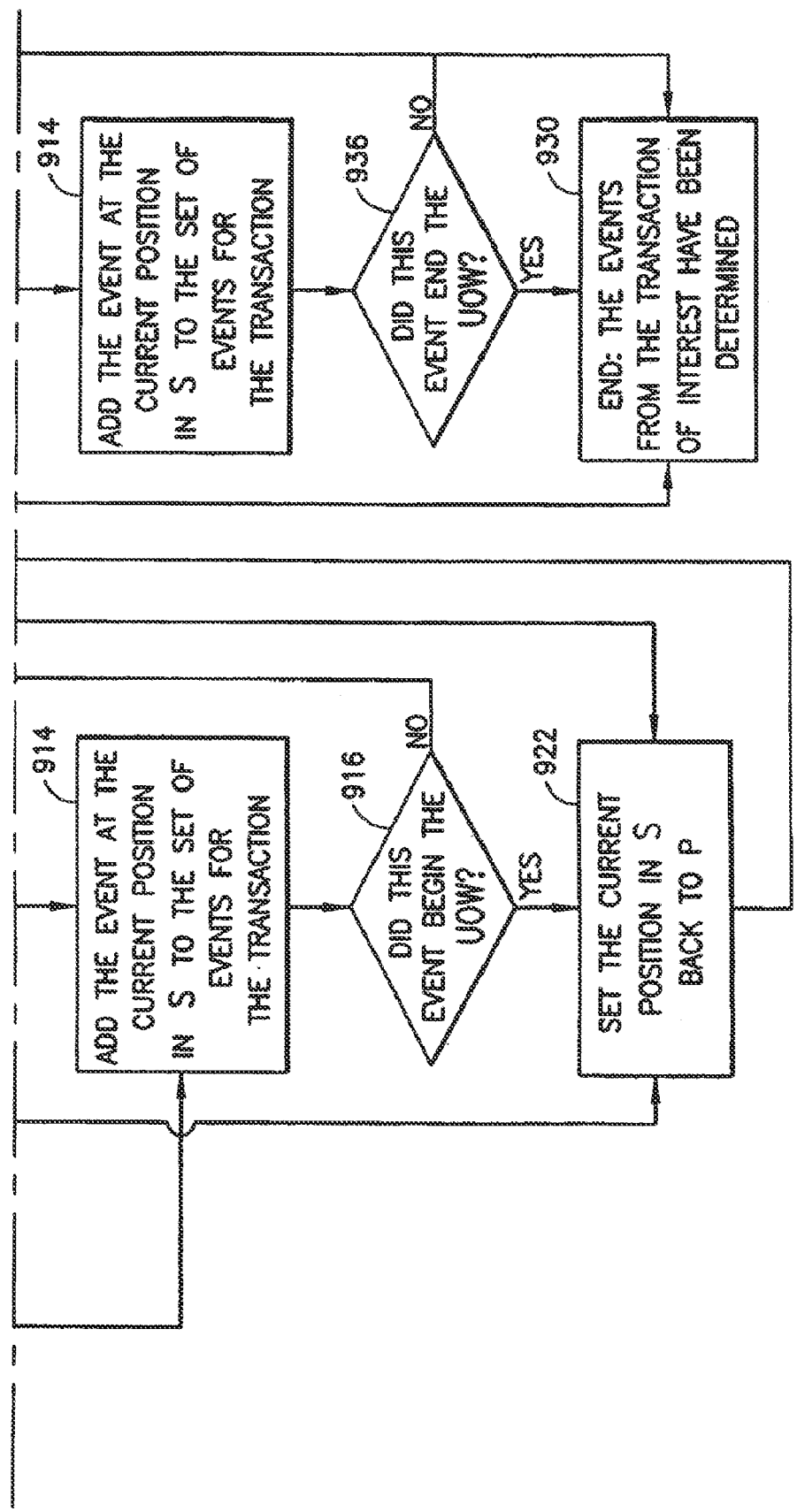
Figure 10:
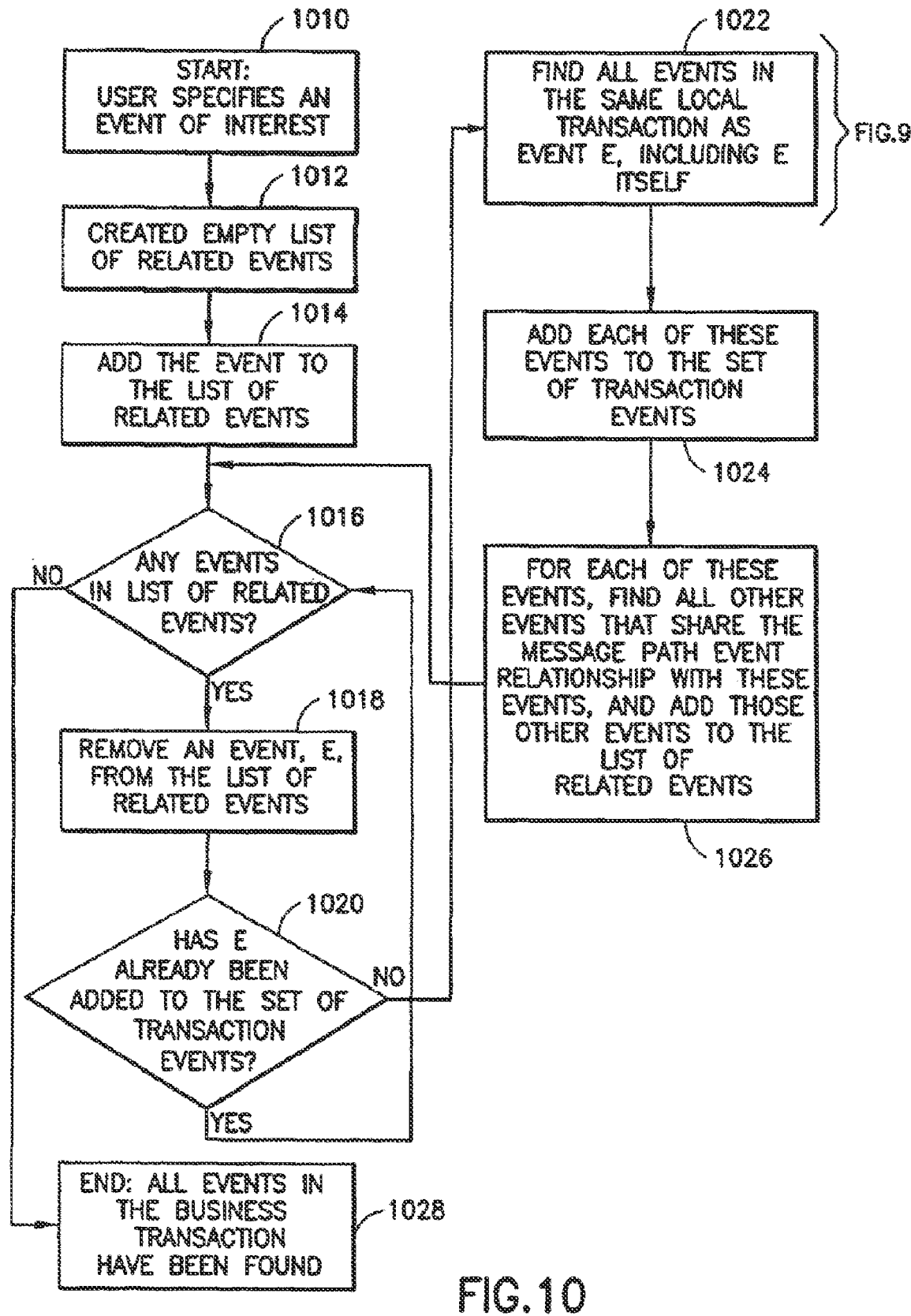

FIGS. 9 and 10 illustrate the processes that the analyzer 10 uses to group events automatically into related transactions, either within a single thread of execution and unit of work (UOW, a local transaction) as in FIG. 9, or across multiple threads of execution, units of work, processes, and/or hosts (a global or business transaction), as in FIG. 10.

In general, given a starting event (e) of interest to the user, the transaction analysis module can locate other events that occurred within the same local or business transaction as the event of interest. The user interface 812A may then display for the user the subset of the recorded events that are within that transaction of interest. This allows the user to quickly focus on the events relevant to the problem being analyzed.

A local transaction includes the operations (e.g., API calls such as MQPUT, MQGET and MQCMIT (commit)) that are performed during the time span of a single unit of work (UOW). Operations performed within one unit of work are either committed or are backed out together, so that the effects of these many operations all are either made permanent (committed) or reversed (backed out) as one atomic group. This is a common feature of many transaction oriented technologies, including databases and middleware.

A global or business transaction includes the operations done within one or more related local transactions. When communication occurs between the threads of execution of different units of work, these units of work are considered part of the same business or global transaction. For example, when a client process sends a message to a server process, it will do so in the context of a local transaction, and the server receiving the message will similarly do so within a second local transaction. The operations performed within these two local transactions, both the communication operations that allow the two processes to exchange data as well as any other computational operations within these local transactions, are thus part of the same business transaction.

Referring first to FIG. 9, at step 910 the user specifies an event (e) of interest, and at step 912 the analyzer locates the event of interest in the time-sorted set of database 20 events, S, for event e's thread of execution. The resulting position in S is denoted as P. At step 914 the event at the current position in S is added to a set of events for the transaction. A test is then made at step 916 to determine if this event began the unit of work. If it did not, control passes to step 918 to find a previous event in S, and a determination is made at step 920 if a previous event exists in S. If there is no previous event, control passes to step 922 to set the current position in S back to p. Step 922 is executed as well if the determination at step 916 is yes, otherwise if a previous event is found to exist at step 920 control passes to step 924. At step 924 a determination is made if the previous event is in the same unit of work. If no, control passes to step 922, otherwise if yes, control passes back to step 914 where the event at the current position in S is added to the set of events for the transaction, and the method then continues the search for the first event in the unit of work. Eventually the method will terminate the backwards (in time) search of S and will execute step 922, after which control passes to step 926 where a forward search through S is initiated. At step 926 a search is made for the next event in S. If a next event does not exist (step 928) control passes to step 930 to terminate the method, and the events from the transaction of interest have been determined. If a next event in S is found to exist at step 928 control passes to step 932 to determine if this next event is in the same unit of work. If no, control passes back to step 926 to find the next event in S, otherwise if yes, control passes to step 934 to add the event at the current position in S to the set of events for this transaction. At step 936 a test is made to determine if this event ends the unit of work (e.g., was the captured API call a MQCMIT for this UOW?) If no, control passes back to step 926 to continue the forward search through S for adding associated event to the transaction until the event that ends the UOW is located. Finally, at step 936 the event that ends the UOW is identified, and control passes to step 930 to terminate the method. At this time the list of events that make up the UOW can be displayed to the user for analysis.

FIG. 10 depicts the operation of the analyzer transaction correlation function at a higher (business transaction) level that can transcend multiple threads and hosts. At step 1010 the method starts by the user specifying an event of interest, and at step 1012 an empty (null) list of related events is created. At step 1014 the event of interest is added to the list of related events, thereby providing one entry. At step 1016 a recursion is initiated, where the list is checked to determine if it contains an entry. Since an event was just placed in the list, the yes path is taken to step 1018 to remove the event (e), and a check is made at step 1020 to determine if the event (e) has already been added to a set of transaction events. Assuming at this point that it has not, control passes to step 1022, to find all events in the same local transaction, such as the same UOW, as event (e), including event (e). In this case the method shown in FIG. 9 is executed, as described above. At the completion of the execution of the method of FIG. 9, control passes to step 1024 to add each of the determined events (i.e., those in step 930 of FIG. 9 corresponding to a UOW) to the set of transaction events. Control then passes to step 1026 where, for each of the events from step 1024, all other events that share the same message path event relationship with these events are located, and added to the list of related events. Control then reverts to step 1016. After one of the events is removed from the list, and if it has already been added to the list of transaction events, then control passes back to step 1016 to remove the next event, otherwise control passes to step 1022 to execute again the method of FIG. 9. Eventually, all events in the business transaction will have been found, and the method will terminate at step 1028. What results is a set of connected or correlated events for a transaction that are collected across all processes. These transaction events can then be displayed to a user in a common format for review and analysis, which is a desired result of the teachings found herein.

As was described above, the analyzer 10 makes use of the COM object model 722 and a Visual Basic™ scripting engine 814 to allow a human user to interact with the internal data model and runtime event data.

Figure 13:
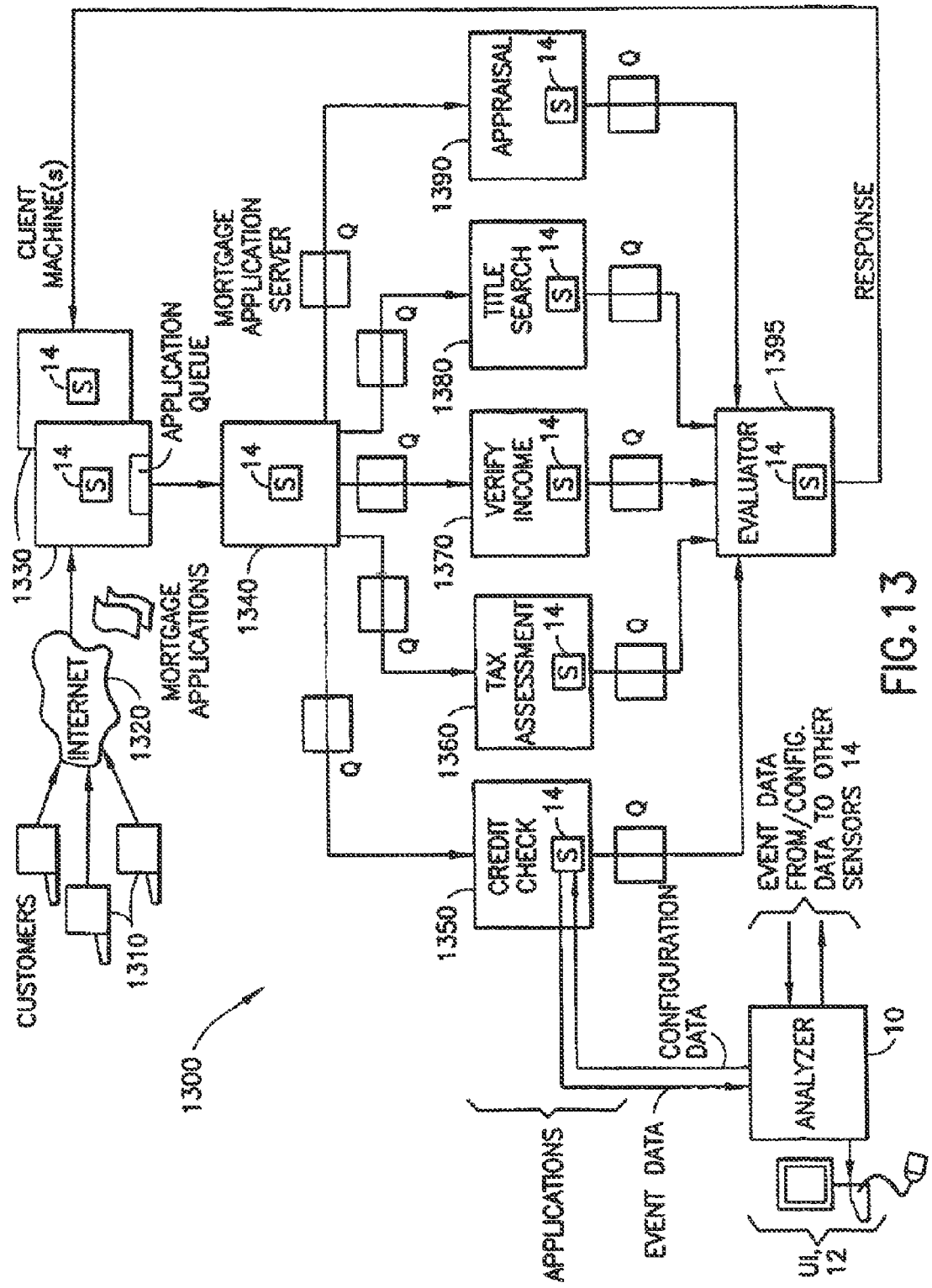
FIG. 13 is a block diagram of an exemplary distributed enterprise middleware-based system that includes the analyzer and related components in accordance with the teachings herein.

FIG. 13 is a block diagram of a distributed enterprise middleware-based system 1300 that includes the analyzer and related components in accordance with the teachings described above. The system 1300 is assumed to be, for this example, a system that receives data representing mortgage applications from on-line users or customers 1310 via a global data communications network such as the internet 1320. One or more client machines 1330 receive the mortgage applications from the internet 1320 and provide them to an application (mortgage request processing) server 1340. The server 1340 parses various data fields of the mortgage requests and sends messages to various distributed applications running on a plurality of hardware/software platforms or processors so as to process the mortgage requests. For example, these applications can include a credit check application 1350, a tax assessment application 1360, a verify income application 1370, a title search application 1380 and an appraisal application 1390. The various applications could all be localized in one facility, or they could be distributed over a large geographical area. One or more of the applications (e.g., the credit check application), may be associated with another business entity altogether, who may or may not employ the teachings of this invention. In this case, a sensor 14 may not be installed on the associated application. However, the input and output message queues to and from this processing entity/application can be monitored to obtain some knowledge as to the operation thereof.

It should be noted that some of these applications may require human intervention. For example, the appraisal application will typically require that an appraiser actually examine the property for which the mortgage is being sought. As such, the various applications can differ widely in their response times (e.g., seconds to days or even weeks).

The various applications in turn output their respective results to a mortgage request evaluation application 1395, which in turn eventually provides a response back to the client machine(s) 1330, such as 'approved', 'disapproved', 'conditionally approved', etc.

The various functional elements shown in FIG. 13 can be executed on a plurality of diverse operating platforms using a plurality of different types of operating systems, data formats, internal data representations, etc. As can be appreciated, if erroneous results are obtained, it is important to determine the source of the problem so that the problem can be corrected. However, this task is complicated by the fact that some thousands of different mortgage requests may be in process at any given time, in various stages of completion.

A message-oriented middleware system, such as the above-mentioned MQSeries™, operates over the various processors and components of the system 1300, and provides message queues (Q). Messaging is preferably employed to send data between processors (instead of calling each other directly), and the queues facilitate the messaging function by temporarily storing the messages so that the various programs and applications can run independently and asynchronously relative to one another. Although not shown in FIG. 13, it is typically the case, but not required, that a queue manager will be resident on each of the processors to manage and control the storage and retrieval of messages in the queue(s).

In accordance with the teachings of this invention a plurality of the sensors 14 are operated with the various applications to selectively capture event data based on the configuration data and commands sent from the analyzer 10. The captured event data flows back to the analyzer 10 from the sensors 14, and is analyzed as described above to isolate and track the flow of one or more transactions. In this manner the operator can determine, for example, if an application generated a proper message and/or if another application actually received the message, the underlying reason when a failure code is reported, whether a particular message was properly formatted, whether a receiving application generated a reply to a particular message and, relatedly, if the sending application actually received the reply, the timing associated with message processing, and whether a particular message generated at one level or tier of a hierarchical system actually propagated to other level(s) as intended.

Through the user interface 12 the operator is enabled to formulate, via the scripting capabilities, desired transaction views and event selections, and to sort the collected event data by, for example, time, call type, queue, queue manager, host, process thread and other criteria. By selecting events in one or more of the presented views of the event data, the operator is enabled to then "drill down" into more of the details of the captured event, such as the message descriptor and the user data. That is, instead of simply being presented with streams of numbers and return codes (see FIG. 15), the analyzer 10 presents the transaction event information in a human readable and comprehendible format.

Figure 14:
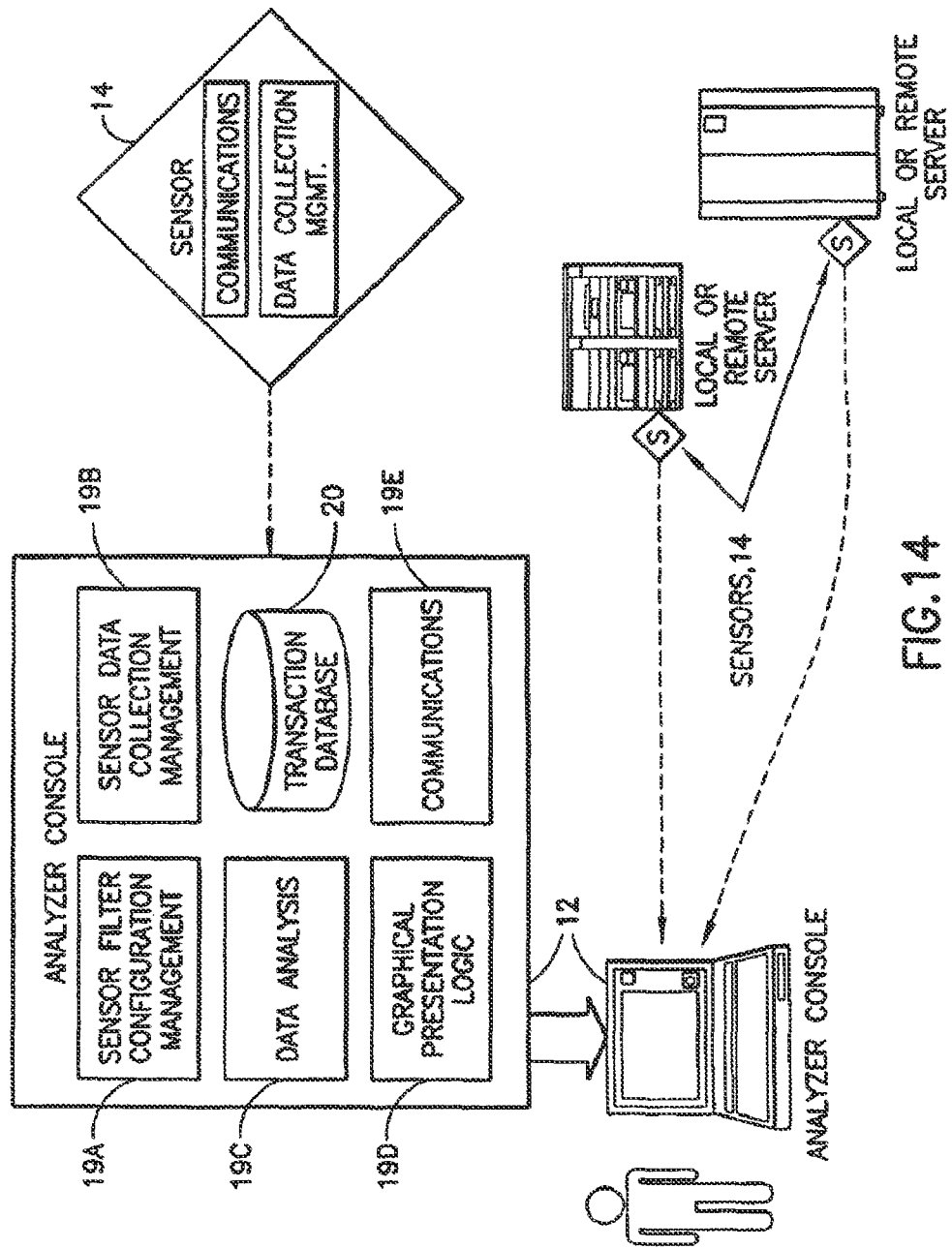
FIG. 14 is a conceptual block diagram of the analyzer console and its interface with sensors.

Further in this regard, and referring to FIG. 14, the analyzer console 12 is the primary point of interface for diagnosing problems in the applications. The analyzer console 12 receives event messages from the sensors 14, stores the event messages in the transaction database 20, and operates on the stored event data with a data analysis module 19C, as described above. The analyzer console 12 also includes other logical and functional blocks, including a sensor filter configuration management block 19A, a sensor data collection management block 19B, a graphical presentation logic block 19D, and a communications block 19E.

The graphical presentation logic block 19D cooperates with the other components of the analyzer to provide a plurality of views of the captured event data. One view is referred to as a component layout view which graphically displays the components of the overall distributed system being monitored, including the message queues (Q) being used, hosts and processes involved, and which process (application) is in communication with which queue (Q). The links between queues and the processes are preferably displayed using lines or arcs, where a thickness (or color or some other visual characteristic) is employed to indicate an amount of message traffic passing through the process/queue link. The resulting view may resemble FIG. 13, with the links between applications and queues (Q) being annotated or otherwise visually indicating an amount of message traffic.

Figure 16:
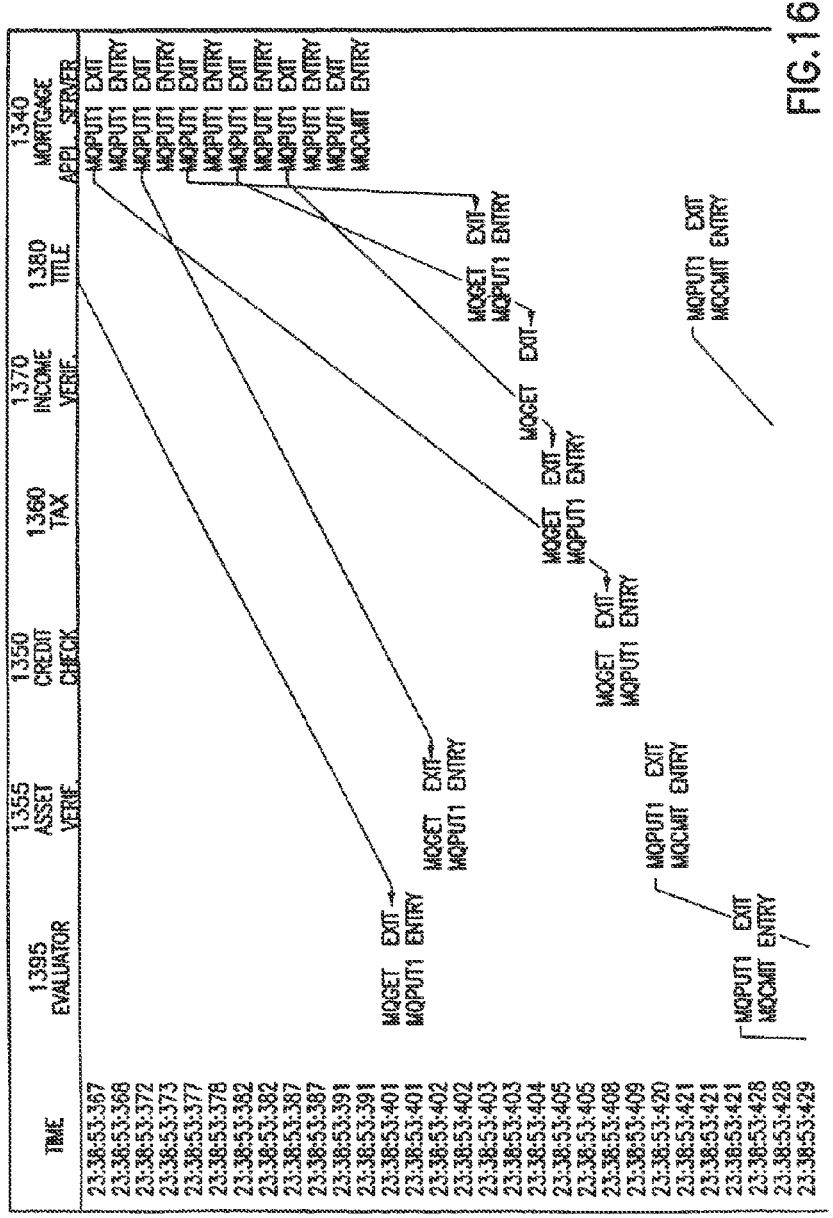
FIG. 16 is an exemplary dynamic transaction visualization of message flow and API calls in the distributed enterprise middleware-based system of FIG. 13.

Another view is referred to as dynamic transaction visualization (FIG. 16 presents one example), where transactions are shown as they happen or have happened, across multiple hosts, operating systems and applications. Presentation filters can be employed to reduced the display to only the events that are applicable to a particular transaction, thus allowing rapid analysis of transaction problems. Note that in FIG. 16, in addition to the various hosts and application shown in FIG. 13, an Asset Verification application 1355 has been added as well.

Another view is referred to as an event history, where the operator is enabled to view all captured events at a level of detail specified by the operator. These details can include, but are not limited to, the message queue that the event was placed in, the originating application and host, and the return code from a call in a human readable format (as opposed to a number). The event data can also be sorted by any of these fields so that the events can be viewed in chronological order, from a particular process or host, or by any of a plurality of event-viewing columns.

Figure 17:
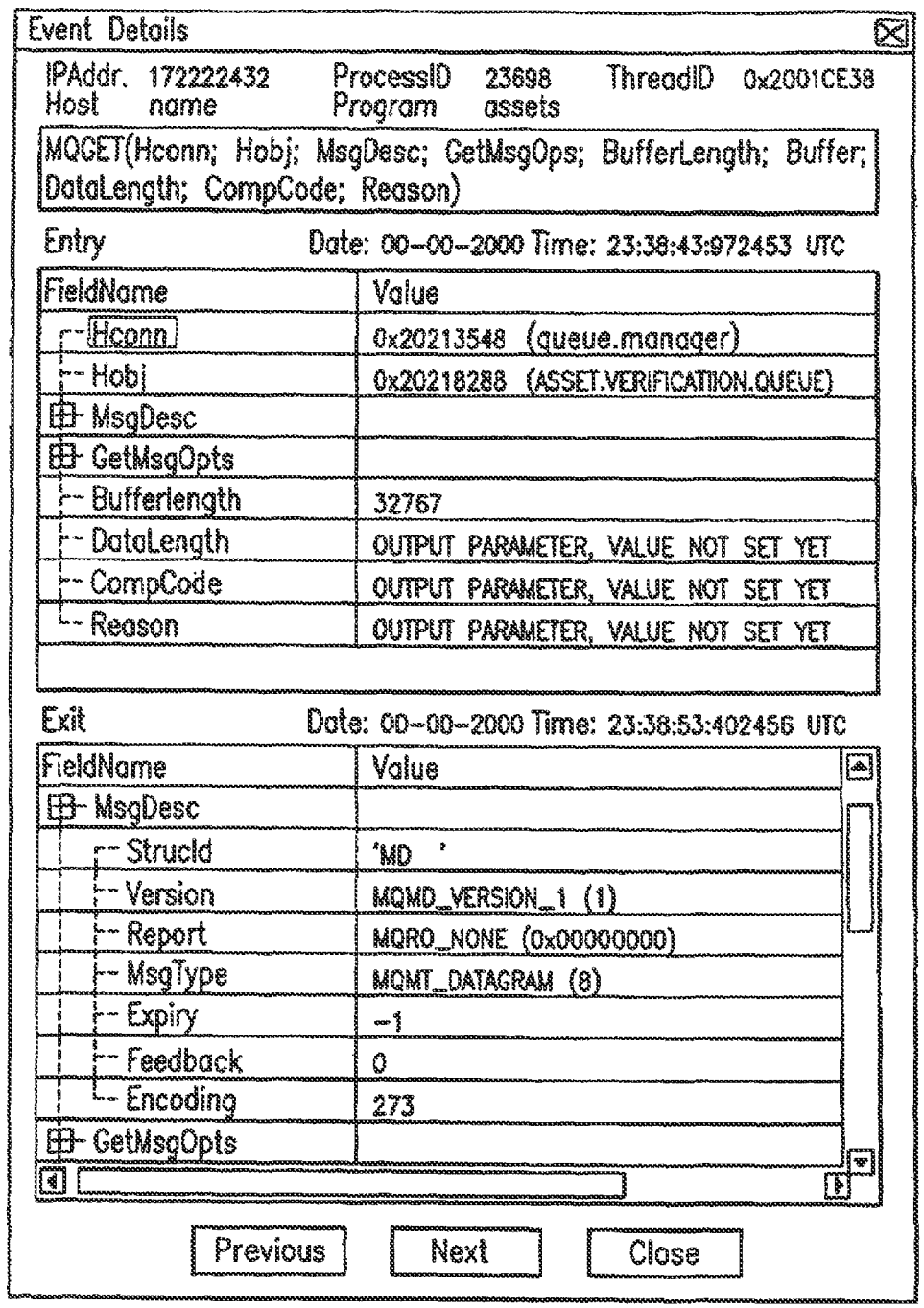
FIG. 17 illustrates how the captured event data can be visualized in an event details mode.

Referring to FIG. 17, the event data can also be viewed in what is referred to as an event details mode. By specifying a particular event, the operator is enabled to view even more detail than is present in the event history view. The event details can include, by example, all of the information in the message header, a "dead letter" queue header, and also user data in the message. Also, return codes can be displayed so that they are readable, e.g., MQRC_SYNCPOINT_LIMIT_REACHED, as opposed to simply the return code "2024". Also, the analyzer 10 may provide hypertext links to the middleware documentation, so that by clicking on a particular return code the operator is enabled to obtain more specific information directly from the provider of the middleware.

As an aid in identifying problems, certain error conditions may be color-coded to make them visually distinct. For example, an invalid return code from an MQI call can be displayed in red so that the operator can quickly see that a particular MQI call is failing. The same could be performed for an MQCONN call, enabling the operator to see connections to a message queue that is failing.

The above-described views provide a significant advantage over the conventional techniques for debugging and analyzing problems that arise in a distributed middleware-based system. For example, FIG. 15 shows an exemplary content of a log file used to record message traffic after a tracing facility is enabled in the MQSeries™ system. In FIG. 15 the data is actually truncated, as normally the complete function names and return codes are present. Also, the return codes are given as values, not as literals. It should be apparent that attempting to trace a given transaction across multiple hosts and operating systems is not a simple task, as a number of such records may need to be printed, and the various API calls and data then visually matched.

The analyzer 10, in accordance with the teachings herein, simplifies and automates this error analysis and transaction trace processing, and can provide the operator with messages and other data relating to a single transaction of interest, obtained from the suitably configured sensors 14 that are strategically located through the distributed data processing system.

The analyzer 10, in addition to capturing message event data in real time, can be used with pre-recorded data.

While some conventional management and monitoring tools are known for use with middleware systems, such as the MQSeries™, these conventional tools typically focus on system data, such as queue status. In accordance with the foregoing teachings, it can be appreciated that the analyzer 10 instead provides logical diagnosis information to the operator (such as API calls, call arguments, return values, etc.). Furthermore, the analyzer 10 correlates API calls made from different components of the distributed system to form a complete transactional view, including a graphical depiction of the distributed system (similar to, for example, FIG. 13).

While described primarily in the context of the MQSeries™ middleware system, the teachings of this invention have application to a number of types of systems and technologies including, but not limited to, those known as CGI/HTTP, ISAPI, NSAPI, CORBA and COM/DCOM. The teachings of this invention are thus not limited for use with only those technologies that are based on a message passing architecture.

Also, while described above primarily in the context of a development tool, it should be realized that the analyzer 10 can be used as well in a production monitoring capacity. That is, once a particular business application (such as the exemplary mortgage processing application shown in FIG. 13) has been developed and deployed, the analyzer 10 can be used to identify and diagnose problems as they occur in the production environment.

Based on the foregoing it can be appreciated that the teachings herein enable providing each stored event in the event database with a unique ID, thereby facilitating the rapid retrieval of a specific event from the event database.

Furthermore, by using the record address as the event ID, the data manager is enabled to provide various cursors to access events according to various criteria, without requiring that the database be locked up during cursor manipulation. The event cursor enables the operator to enumerate through events one at a time, based on certain conditions, without having to read all events into memory.

Furthermore, the analyzer 10 provides event relationship lookup records to assist the transaction analysis algorithm. The lookup record provides a high performance, fast access to a list of events with the same attribute value. Without this persistent nature of the lookup records in the event database 20, a runtime transaction analysis for hundreds of some tens or hundreds of thousands of events would become impractical.

Still further in accordance with the foregoing teachings, the analyzer 10 provides a technique to match entry and exit events by saving the entry and the exit for one API call as one event in the event database 20.

In order to accomplish this the analyzer data manager provides a unique ID value for entry and exit events for the same API call so that the event matching algorithm need search only one field, and furthermore preferably constructs a most-recently-stored (MRS) events list in memory so that the performance of the matching process is dramatically improved.

The analyzer 10 database is preferably designed to be technology neutral, which means that the database 20 and related code can be expanded to support different technologies with little or no changes. In order to achieve the capability of being technology neutral, the records in the database 20 for technology-specific resources preferably contain at least a type and a name, and may have as many attribute records as children as needed. In addition, a resource record can be made recursive to satisfy the case of events associated with layered resources. The database 20 and its data manager preferably work with the above-mentioned technology-specific module, for example a technology helper library which is loaded dynamically according to need in order to interpret the technology-specific contents of the event database.

Thus, while the invention has been particularly shown and described with respect to preferred embodiments thereof, it will be understood by those skilled in the art that changes in form and details may be made therein without departing from the scope and spirit of the invention.

What is claimed is:

1. A method for providing logical information for events comprising:
    intercepting a first Application Program Interface (API) call;
    determining whether said first API call meets a criterion;
    wherein said intercepting includes operating a sensor that is automatically enabled upon an occurrence of a pre-programmed triggering event, the sensor thereafter capturing all event data that satisfies a specific data collection filter;
    examining, performed by a computer system, first data from the first (API) call and second data from a second API call; wherein said examining is contingent on said first API call meeting said criterion;
    based on said examining of said first data and said second data, said computer system automatically making a determination selected from a group consisting of:
        (a) whether said first API call sent a message, and said second API call received said message, and
        (b) whether said first API call was conducted in a transactional unit of work, and said second API was also conducted in said transactional unit of work;
    if said first API call sent a message, and said second API call received said message, employing said first data and said second data, which is stored on a computer readable storage medium, in a subsequent process; and
    If said first API call was conducted in said transactional unit of work, and said second API was also conducted in said transactional unit of work, employing said first data and said second data, which are stored on said computer readable storage medium, in said subsequent process.

2. The method of claim 1, wherein said method employed in a distributed data processing system that includes a first processor and a second processor, wherein said first API call is invoked by a first process running on said first processor, and wherein said second API call is invoked by a second process running on said second processor.

3. The method of claim 1, wherein said subsequent process comprises displaying said first data and said second data.

4. The method of claim 1, wherein said intercepting includes operating a sensor that is automatically enabled for responding to an occurrence of an error condition or a change in program states or environments.

* * * * *